US012099256B2

(12) United States Patent
Xie et al.

(10) Patent No.: US 12,099,256 B2
(45) Date of Patent: Sep. 24, 2024

(54) OPTICAL SYSTEM, LENS MODULE, AND TERMINAL DEVICE INCLUDING SEVEN LENSES OF ++−−+−−, +−+−+−−,++−++−−,++−−++− OR ++−−+−+ REFRACTIVE POWERS

(71) Applicant: JIANGXI JINGCHAO OPTICAL CO., LTD., Jiangxi (CN)

(72) Inventors: Han Xie, Jiangxi (CN); Binbin Liu, Jiangxi (CN); Ming Li, Jiangxi (CN); Hairong Zou, Jiangxi (CN)

(73) Assignee: JIANGXI JINGCHAO OPTICAL CO., LTD., Nanchang (CN)

(*) Notice: Subject to any disclaimer, the term of this patent is extended or adjusted under 35 U.S.C. 154(b) by 511 days.

(21) Appl. No.: 17/471,905

(22) Filed: Sep. 10, 2021

(65) Prior Publication Data

US 2022/0003964 A1    Jan. 6, 2022

Related U.S. Application Data

(63) Continuation of application No. PCT/CN2020/084253, filed on Apr. 10, 2020.

(51) Int. Cl.
*G02B 13/00* (2006.01)
*G02B 9/64* (2006.01)

(52) U.S. Cl.
CPC ........... *G02B 9/64* (2013.01); *G02B 13/0045* (2013.01)

(58) Field of Classification Search
CPC .............................. G02B 9/64; G02B 13/0045
See application file for complete search history.

(56) References Cited

U.S. PATENT DOCUMENTS

| 2018/0106984 A1 | 4/2018 | Tang et al. |
| 2019/0154972 A1 | 5/2019 | Zhang et al. |
| 2019/0204555 A1 | 7/2019 | Jhang et al. |

(Continued)

FOREIGN PATENT DOCUMENTS

| CN | 108089317 A | 5/2018 |
| CN | 108254864 A | 7/2018 |

(Continued)

OTHER PUBLICATIONS

The International Search Report issued in corresponding International Application No. PCT/CN2020/084253, mailed Jan. 12, 2021, pp. 1-10, Beijing, China.

(Continued)

*Primary Examiner* — Wen Huang
(74) *Attorney, Agent, or Firm* — HAUPTMAN HAM, LLP

(57) ABSTRACT

An optical system, a lens module, and a terminal device are provided. The optical system includes a first lens and a fifth lens, each of which has a positive refractive power. The optical system also includes multiple lenses with refractive powers. Each of the first lens, a second lens, and a seventh lens has an object-side surface which is convex at an optical axis. Each of the third lens and a fifth lens has an image-side surface which is convex at the optical axis. The seventh lens has an image-side surface which is concave at the optical axis. The seventh lens has an inflection point on the object-side surface and/or the image-side surface. The optical system satisfies the expressions tan $\omega/f > 0.21$ mm$^{-1}$ and $Y2/Y1+Y3/Y1+Y4/Y1 < 3.1$.

16 Claims, 17 Drawing Sheets

(56) References Cited

U.S. PATENT DOCUMENTS

| 2019/0369359 | A1 | 12/2019 | Son et al. |
| 2019/0369360 | A1 | 12/2019 | Jung et al. |
| 2019/0369367 | A1 | 12/2019 | Park et al. |
| 2020/0041770 | A1 | 2/2020 | Chen |

FOREIGN PATENT DOCUMENTS

| CN | 109683294 A | 4/2019 |
| CN | 109960014 A | 7/2019 |
| CN | 110031956 A | 7/2019 |
| CN | 210051916 U | 2/2020 |

OTHER PUBLICATIONS

The extended European search report issued in corresponding EP application No. 20926375.5 dated Nov. 8, 2022.

OPTICAL SYSTEM, LENS MODULE, AND TERMINAL DEVICE INCLUDING SEVEN LENSES OF ++−−+−−, +−+−+−−,++−++−−,++−−++− OR ++−−+−+ REFRACTIVE POWERS

CROSS-REFERENCE TO RELATED APPLICATION (S)

This application is a continuation of International Application No. PCT/CN2020/084253, filed on Apr. 10, 2020, the disclosure of which is hereby incorporated by reference in its entirety.

TECHNICAL FIELD

This disclosure relates to the field of optical imaging technology, and more particularly to an optical system, a lens module, and a terminal device.

BACKGROUND

In recent years, with the popularity of portable electronic devices such as smart phones and tablet personal computers (PCs), the demand of users for the camera lens loaded thereon is increasing. A wide-angle lens can capture a vaster scene within a limited distance, which satisfies the usage experience and the demand of the users.

Generally speaking, most of the portable electronic devices are loaded with five-piece wide-angle lenses, or sometimes six-piece wide-angle lenses. However, these lenses are hard to satisfy the demands for a compact size and high imaging quality at the same time. Therefore, it requires a wide-angle lens with a compact size and excellent imaging quality to satisfy the demand for the usage experience of the users.

SUMMARY

Disclosed herein are implementations of an optical system, a lens module, and a terminal device. The optical system realizes a compact size and high imaging quality of a wide-angle lens to improve usage experience for users.

In a first aspect, according to implementations of this disclosure, an optical system is provided. The optical system includes in order from an object side to an image side: a first lens with a positive refractive power, a second lens with a refractive power, a third lens with a refractive power, a fourth lens with a refractive power, a fifth lens with a positive refractive power, a sixth lens with a refractive power, and a seventh lens with a refractive power. The first lens has an object-side surface which is convex at an optical axis. The second lens has an object-side surface which is convex at the optical axis. The third lens has an image-side surface which is convex at the optical axis. The fifth lens has an image-side surface which is convex at the optical axis. The seventh lens has an object-side surface which is convex at the optical axis and an image-side surface which is concave at the optical axis. At least one of the object-side surface or the image-side surface of the seventh lens has an inflection point. The refractive power represents a capacity of the optical system to deflect a ray. Each of the second lens, the third lens, the fourth lens, the fifth lens, the sixth lens, and the seventh lens has the respective refractive power, which means that each of the second lens, the third lens, the fourth lens, the fifth lens, the sixth lens, and the seventh lens may have a positive or negative refractive power. The lens with the positive refractive power can converge light whereas the lens with the negative refractive power can diverge the light. For example, in one implementation, the first lens has a positive refractive power, the second lens has a positive refractive power, the third lens has a negative refractive power, the fourth lens has a negative refractive power, the fifth lens has a positive refractive power, the sixth lens has a negative refractive power, and the seventh lens has a negative refractive power. There may be other combinations of the refractive powers of the seven lenses. When the lens has no refractive power, that is, the refractive power equals to zero, planar refraction will occur where the ray parallel to an axis remains parallel to the axis after refraction. The optical system satisfies the expressions tan $\omega/f > 0.21$ mm$^{-1}$ and $Y2/Y1 + Y3/Y1 + Y4/Y1 < 3.1$, where tan $\omega$ represents a tangential value of half of a maximum angle of view of the optical system, f represents an effective focal length of the optical system, Y1 represents an optical maximum effective radius of the object-side surface of the first lens, Y2 represents an optical maximum effective radius of the object-side surface of the second lens, Y3 represents an optical maximum effective radius of an object-side surface of the third lens, and Y4 represents an optical maximum effective radius of an object-side surface of the fourth lens.

Through proper arrangement of the refractive power of each of the first lens to the seventh lens and the surface profile of each of the first lens, the second lens, the third lens, the fifth lens, and the seventh lens and the setting of tan $\omega/f > 0.21$ and $Y2/Y + Y3/Y1 + Y4/Y1 < 3.1$, the optical system has characteristics of compact size and wide-angle imaging. Through the setting of the inflection point, the excessive increase of an angle of incident ray of off-axis field of view can be suppressed, which can effectively correct aberration and reduce distortion to improve the imaging quality.

Through controlling the optical maximum effective radius of each of the first lens, the second lens, the third lens, and the fourth lens, the optical system can have a small forward end aperture and a small head shape, which satisfies the demand for the compact size of the optical system. If $Y2/Y1 + Y3/Y1 + Y4/Y1 \geq 3.1$, any aperture of the first lens, the second lens, the third lens, and the fourth lens is relatively large, so that the entire volume of the forward end of the optical system will become larger, which is not beneficial to the realization of the compact size of the optical system. Through proper arrangement of a range of tan $\omega/f$, the optical system has the characteristic of wide-angle imaging. If tan $\omega/f \leq 0.21$, the angle of view will become smaller and a range of the captured image will become narrower on the condition that the focal length is the same.

In some implementations, the optical system satisfies the expression $1 < f1/f < 1.6$, where f represents an effective focal length of the optical system, and f1 represents a focal length of the first lens. Through the proper arrangement of the range of a ratio of f1/f, field curvature of the optical system can be corrected and the high imaging quality can be ensured. In addition, the effective focal length of the optical system can be reasonably shortened, which facilitates the shortening of a total length of the optical system, so that the optical system has the characteristic of compact size.

In some implementations, the optical system satisfies the expression $f/2/f34 > -0.54$, where f12 represents a combined focal length of the first lens and the second lens, and f34 represents a combined focal length of the third lens and the fourth lens. The combined lens of the first lens and the second lens provides the positive refractive power. The combined lens of the third lens and the fourth lens provides the negative refractive power, which can facilitate the correction of spherical aberration generated by the first lens and the second lens. When f/2/f34>−0.54, the optical system can have the high imaging quality. When f12/f34≤−0.54, the combined focal length of the first lens and the second lens becomes larger and the positive refractive power smaller, which is not beneficial to the improvement of the imaging quality.

In some implementations, the optical system satisfies the expression 1.66<n4<1.69, where n4 represents a refractive index of the fourth lens. The fourth lens has a high refractive index, which can improve a modulation transfer function of the optical system to realize a better systematic performance and correct chromatic aberration to ensure the imaging quality In some implementations, the optical system satisfies the expression 0.5<f/f5<1.4, where f represents an effective focal length of the optical system, and f5 represents a focal length of the fifth lens. The first lens provides most of the positive refractive power for imaging. The fifth lens compensates the first lens and provides the positive refractive power together with the first lens to improve the imaging quality.

In some implementations, the optical system satisfies the expression 3.7<f/CT5<5.1, where f represents an effective focal length of the optical system, and CTS represents a thickness of the fifth lens on the optical axis. The fifth lens has the positive refractive power. Through the proper arrangement of the thickness of the fifth lens on the optical axis, the total length of the optical system can be effectively shortened to facilitate the realization of the compact size of the optical system.

In some implementations, the optical system satisfies the expression TTL/EPD<2.8, where TTL represents a distance on the optical axis from the object-side surface of the first lens to an imaging surface of the optical system, and EPD represents an entrance pupil diameter of the optical system. Generally, the optical system with seven-piece lenses will be configured with the bigger entrance pupil diameter to increase an amount of passed light. Through the proper arrangement of the ratio of TTL/EPD, the total length of the optical system can be effectively shortened to facilitate the realization of the compact size of the optical system.

In some implementations, the optical system satisfies the expression FNO/ImgH≤0.55 mm$^{-1}$, where FNO represents an F-number of the optical system, and ImgH represents half of a diagonal length of an effective pixel area on the imaging surface of the optical system. Through defining the proper range of FNO/ImgH, the optical system can have the large aperture to improve the imaging quality.

In a second aspect, according to implementations of this disclosure, a lens module is provided. The lens module includes the optical system of any of the implementations as described above and a photosensitive element located at the image side of the optical system.

In a third aspect, according to implementations of this disclosure, a terminal device is provided. The terminal device includes the lens module as described above.

Through the proper arrangement of the refractive power of each of the first lens to the seventh lens and the surface profile of each of the first lens, the second lens, the third lens, the fifth lens, and the seventh lens and the setting of tan ω/f>0.21 and Y2/Y1+Y3/Y1+Y4/Y1<3.1, the optical system has characteristics of compact size and wide-angle lens imaging. Through the setting of the inflection point, the excessive increase of an angle of incident ray of off-axis field of view can be suppressed, which can effectively correct aberration and reduce distortion to improve the imaging quality.

BRIEF DESCRIPTION OF THE DRAWINGS

To describe the technical solutions in implementations of the present disclosure or in the background more clearly, the following briefly introduces the accompanying drawings required for describing the implementations or the background.

DETAILED DESCRIPTION

Implementations of this disclosure will be described hereinafter with reference to the accompanying drawings of this disclosure.

Figure 1:
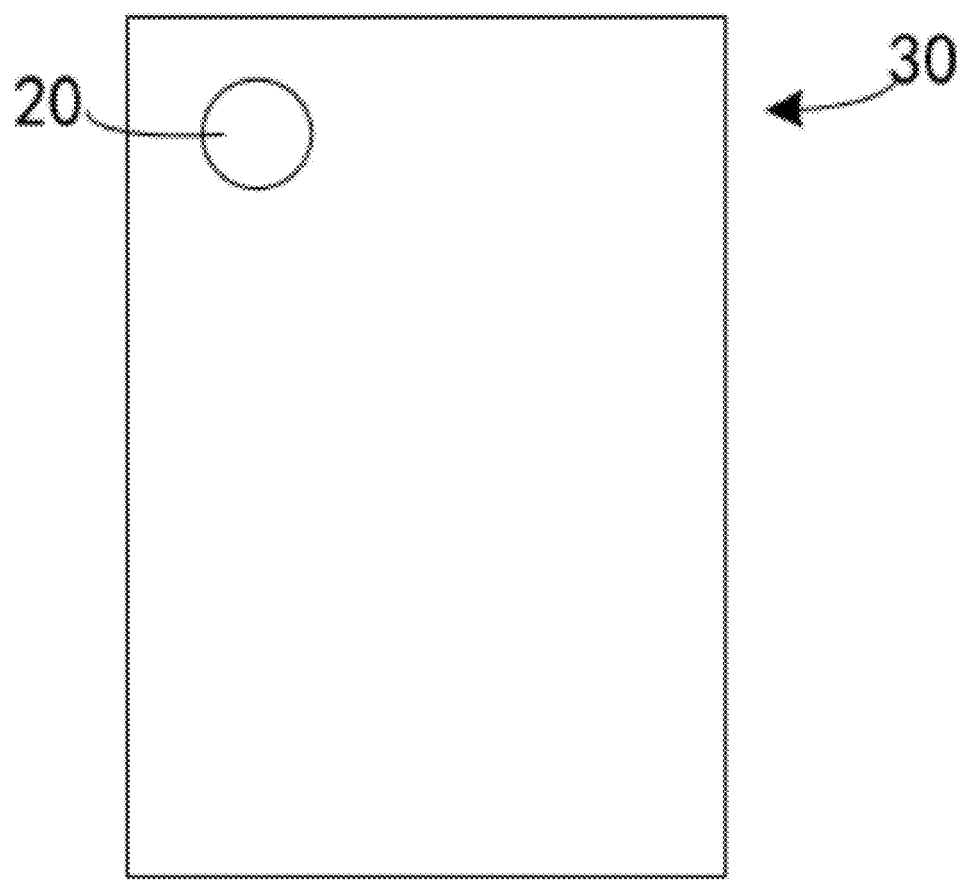
FIG. 1 is a schematic diagram of an optical system applied in a terminal device according to this disclosure.

Referring to FIG. 1, an optical system in this disclosure is applicable in a lens module 20 of a terminal device 30. The terminal device 30 may be a mobile phone, a tablet computer, a drone, a computer, and other types of devices. A photosensitive element of the lens module 20 is located at an image side of the optical system, and the lens module 20 is assembled in the terminal device 30.

In this disclosure, a lens module is provided. The lens module includes a photosensitive element and the optical system according to the implementations of the disclosure. The photosensitive element is located at the image side of the optical system. The photosensitive element is configured to convert a ray, which passes through the first to seventh lenses and is incident on the photosensitive element, to an electrical signal of an image. The photosensitive element may be a complementary metal oxide semiconductor (CMOS) or a charge-coupled device (CCD). Through installation of the optical system in the lens module, the lens module can have characteristics of wide-angle imaging and compact size as well as good imaging quality.

In this disclosure, a terminal device is provided. The terminal device includes the lens module in implementations of this disclosure. The terminal device can be a mobile phone, a tablet computer, a drone, a computer, and other types of devices. Through the installation of the lens module in the terminal device, the terminal device can have characteristics of wide-angle imaging and compact size as well as good imaging quality.

In this disclosure, an optical system is provided. The optical system includes seven lenses, i.e., a first lens, a second lens, a third lens, a fourth lens, a fifth lens, a sixth lens, and a seventh lens, arranged in order from an object side to an image side of the optical system.

The surface profile and the refractive power of each of the seven lenses can be set as follows. The first lens has a positive refractive power, where the first lens has an object-side surface which is convex at an optical axis. The second lens has a refractive power, where the second lens has an object-side surface which is convex at the optical axis. The third lens has a refractive power, where the third lens has an image-side surface which is convex at the optical axis. The fourth lens has a refractive power. The fifth lens has a positive refractive power, where the fifth lens has an image-side surface which is convex at the optical axis. The sixth lens has a refractive power. The seventh lens has a refractive power, where the seventh lens has an object-side surface which is convex at the optical axis and an image-side surface which is concave at the optical axis. At least one of the object-side surface or the image-side surface of the seventh lens has an inflection point. The optical system satisfies the expressions $\tan \omega/f > 0.21$ and $Y2/Y1+Y3/Y1+Y4/Y1 < 3.1$, where $\tan \omega$ represents a tangential value of half of a maximum angle of view of the optical system, f represents an effective focal length of the optical system, Y1 represents an optical maximum effective radius of the object-side surface of the first lens, Y2 represents an optical maximum effective radius of the object-side surface of the second lens, Y3 represents an optical maximum effective radius of an object-side surface of the third lens, and Y4 represents an optical maximum effective radius of an object-side surface of the fourth lens.

Through proper arrangement of the refractive power of each of the first lens to the seventh lens and the surface profile of each of the first lens, the second lens, the third lens, the fifth lens, and the seventh lens and setting of $\tan \omega/f > 0.21 mm^{-1}$ and $Y2/Y1+Y3/Y1+Y4/Y1 < 3.1$, the optical system has characteristics of compact size and wide-angle imaging. Through the setting of the inflection point, the excessive increase of an angle of incident ray of off-axis field of view can be suppressed, which can effectively correct aberration and reduce distortion to improve the imaging quality.

Through controlling the optical maximum effective radius of each of the first lens, the second lens, the third lens, and the fourth lens, the optical system can have a small forward end aperture and a small head shape, which satisfies the demand for the compact size of the optical system. If $Y2/Y1+Y3/Y1+Y4/Y1 \geq 3.1$, any aperture of the first lens, the second lens, the third lens, and the fourth lens is relatively large, so that the entire volume of the forward end of the optical system will become larger, which is not beneficial to the realization of the compact size of the optical system. Through proper arrangement of a range of $\tan \omega/f$, the optical system has the characteristic of wide-angle imaging. If $\tan \omega/f \leq 0.21$, the angle of view will become smaller and a range of the captured image will become narrower on the condition that the focal length is the same.

In some implementations, the optical system satisfies the expression $1 < f1/f < 1.6$, where f represents an effective focal length of the optical system and f1 represents a focal length of the first lens. Through the proper arrangement of the range of a ratio of f1/f, field curvature of the optical system can be corrected and the high imaging quality can be ensured. In addition, the effective focal length of the optical system can be reasonably shortened, which facilitates the shortening of a total length of the optical system, so that the optical system has the characteristic of compact size.

In some implementations, the optical system satisfies the expression $f12/f34 > -0.54$, where f12 represents a combined focal length of the first lens and the second lens, and f34 represents a combined focal length of the third lens and the fourth lens. The combined lens of the first lens and the second lens provides the positive refractive power. The combined lens of the third lens and the fourth lens provides the negative refractive power, which can facilitate the correction of spherical aberration generated by the first lens and the second lens. When $f12/f34 > -0.54$, the optical system can have the high imaging quality. When $f12/f34 < -0.54$, the combined focal length of the first lens and the second lens becomes larger and the positive power smaller, which is not beneficial to the improvement of the imaging quality.

In some implementations, the optical system satisfies the expression $1.66 < n4 < 1.69$, where n4 represents a refractive index of the fourth lens. The fourth lens has a high refractive index, which can improve a modulation transfer function of the optical system to realize a better systematic performance and correct chromatic aberration to ensure the imaging quality In some implementations, the optical system satisfies the expression $0.5 < f/f5 < 1.4$, where f represents an effective focal length of the optical system and f5 represents a focal length of the fifth lens. The first lens provides most of the positive refractive power for imaging. The fifth lens compensates the first lens and provides the positive refractive power together with the first lens to improve the imaging quality.

In some implementations, the optical system satisfies the expression $3.7 < f/CT5 < 5.1$, where f represents an effective focal length of the optical system and CT5 represents a thickness of the fifth lens on the optical axis. The fifth lens has the positive refractive power. Through the proper arrangement of the thickness of the fifth lens on the optical axis, the total length of the optical system can be effectively shortened to facilitate the realization of the compact size of the optical system.

In some implementations, the optical system satisfies the expression $TTL/EPD < 2.8$, where TTL represents a distance on the optical axis from the object-side surface of the first lens to an imaging surface of the optical system, and EPD represents an entrance pupil diameter of the optical system. Generally, the optical system with seven-piece lens will be configured with the bigger entrance pupil diameter to increase an amount of passed light. Through the proper arrangement of the ratio of TTL/EPD, the total length of the optical system can be effectively shortened to facilitate the realization of the compact size of the optical system.

In some implementations, the optical system satisfies the expression FNO/ImgH≤0.55 mm$^{-1}$, where FNO represents an F-number of the optical system, and ImgH represents half of a diagonal length of an effective pixel area on an imaging surface of the optical system. Through defining the proper range of FNO/ImgII, the optical system can have the large aperture to improve the imaging quality.

The optical system is provided with aspheric lenses to facilitate the aberration correction of the optical system and improve the imaging quality of the optical system. Equations which apply to aspheric curves include but are not limited to the following expression:

$$Z = \frac{cr^2}{1+\sqrt{1-(k+1)c^2r^2}} + \sum_i A i r^i$$

Where Z represents a distance from a respective point on an aspheric surface to a plane tangent to a vertex of the aspheric surface, r represents a distance from the respective point on the aspheric surface to the optical axis, c represents a curvature of the vertex of the aspheric surface, k represents a conic coefficient, and Ai represents a coefficient corresponding to the i-th higher-order term in the aspheric equation.

Detailed description will be provided hereinafter, through eight implementations, to illustrate this disclosure.

Figure 2:
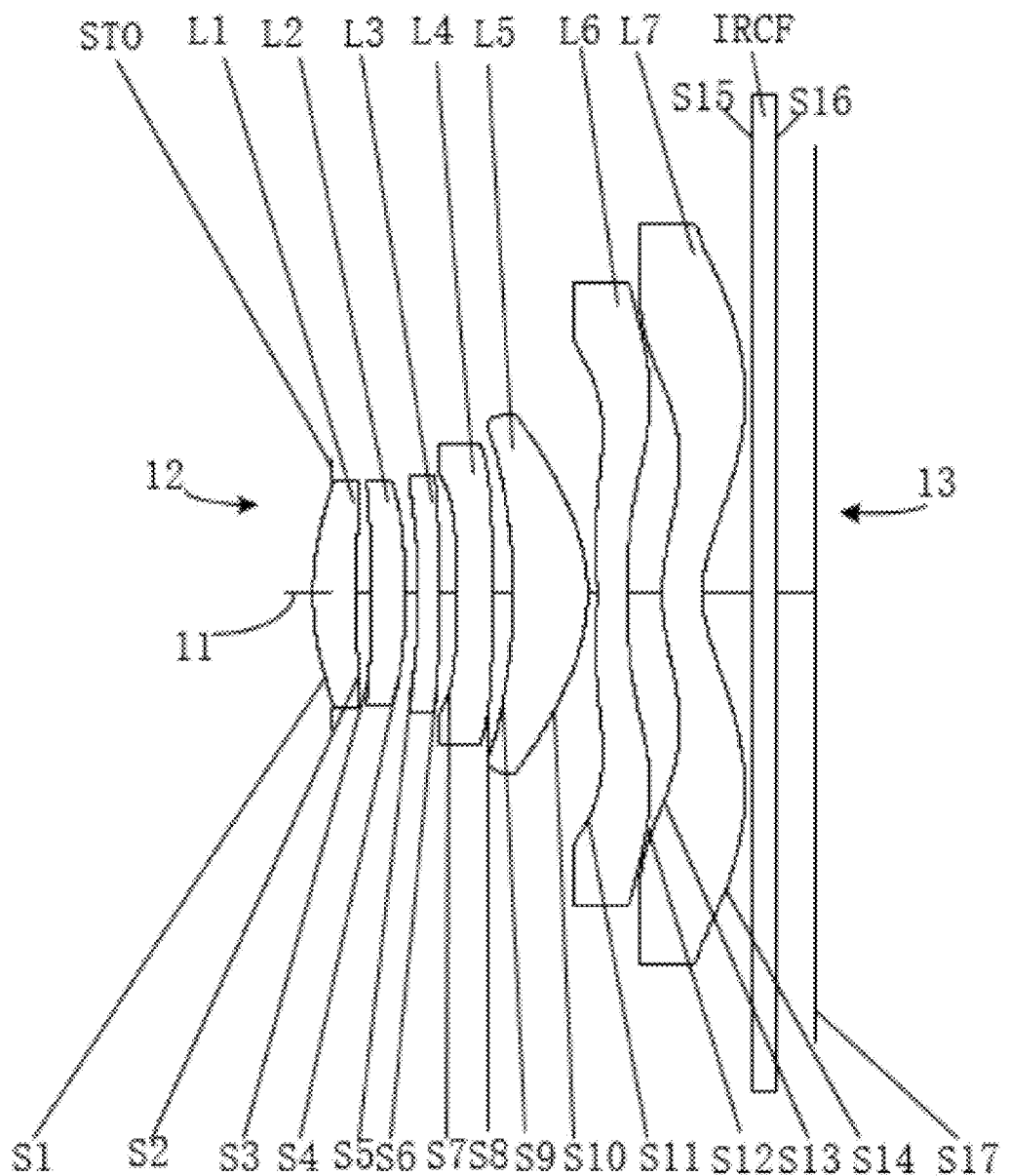
FIG. 2 is a schematic structural diagram of an optical system according to an implementation of this disclosure.

In FIG. 2, a straight line 11 represent an optical axis. A side of a first lens L1 away from a second lens L2 is an object side 12. A side of a seventh lens L7 away from a sixth lens L6 is an image side 13. An optical system of this implementation includes, from the object side 12 to the image side 13, a stop STO, the first lens L1, the second lens L2, a third lens L3, a fourth lens L4, a fifth lens L5, the sixth lens L6, the seventh lens L7, and an infrared cut-off filter (IRCF). At least one of an object-side surface or an image-side surface of the seventh lens L7 has an inflection point.

The first lens L1 with a positive refractive power is made of plastic. An object-side surface S1 is convex at the optical axis and at a periphery. An image-side surface S2 is concave at the optical axis and convex at the periphery. Both the object-side surface S1 and the image-side surface S2 of the first lens L1 are aspheric.

The second lens L2 with a positive refractive power is made of plastic. An object-side surface S3 is concave at the optical axis and at the periphery. An image-side surface S4 is convex at the optical axis and at the periphery. Both the object-side surface S3 and the image-side surface S4 of the second lens L2 are aspheric.

The third lens L3 with a negative refractive power is made of plastic. An object-side surface S5 is concave at the optical axis and at the periphery. An image-side surface S6 is convex at the optical axis and at the periphery. Both the object-side surface S5 and the image-side surface S6 of the third lens L3 are aspheric.

The fourth lens L4 with a negative refractive power is made of plastic. An object-side surface S7 is concave at the optical axis and at the periphery. An image-side surface S8 is concave at the optical axis and convex at the periphery. Both the object-side surface S7 and the image-side surface S8 of the fourth lens L4 are aspheric.

The fifth lens L5 with a positive refractive power is made of plastic. An object-side surface S9 is concave at the optical axis and at the periphery. An image-side surface S10 is convex at the optical axis and at the periphery. Both the object-side surface S9 and the image-side surface S10 of the fifth lens L5 are aspheric.

The sixth lens L6 with a negative refractive power is made of plastic. An object-side surface S11 is concave at the optical axis and at the periphery. An image-side surface S12 is concave at the optical axis and convex at the periphery. Both the object-side surface S11 and the image-side surface S12 of the sixth lens L6 are aspheric.

The seventh lens L7 with a negative refractive power is made of plastic. An object-side surface S13 is convex at the optical axis and at the periphery. An image-side surface S14 is concave at the optical axis and convex at the periphery. Both the object-side surface S13 and the image-side surface S14 of the seventh lens L7 are aspheric.

The stop STO may be located between the object side of the optical system and the seventh lens L7. In this implementation, the stop STO is disposed at one side of the first lens L1 away from the second lens L2 to control the amount of light passed.

The IRCF is disposed after the seventh lens L7. The IRCF has an object-side surface S15 and an image-side surface S16. The IRCF is configured to filter out infrared light so that the light incident onto the imaging surface is visible light. Visible light has a wavelength ranging from 380 nm to 780 nm. The IRCF is made of glass.

An imaging surface S17 is the surface where an image formed by the light of the photographed object after going through the optical system is located.

Table 1a illustrates characteristics of the optical system in this implementation.

TABLE 1a

Implementation of FIG. 2
f = 3.565 mm, FNO = 1.98, FOV = 90°, TTL = 5.04 mm

| Surface number | Surface name | Surface type | Radius of curvature (mm) | Thickness (mm) | Material | Refractive index | Abbe number | Focal length (mm) |
|---|---|---|---|---|---|---|---|---|
| Object surface | Object surface | spheric | Infinity | 446.049 | | | | |
| STO | STO | spheric | Infinity | −0.197 | | | | |
| S1 | First lens | aspheric | 1.881 | 0.432 | plastic | 1.539 | 52.860 | 4.686 |
| S2 | | aspheric | 6.727 | 0.147 | | | | |
| S3 | Second lens | aspheric | −22.902 | 0.352 | plastic | 1.535 | 55.790 | 9.313 |
| S4 | | aspheric | −4.125 | 0.124 | | | | |
| S5 | Third | aspheric | −4.423 | 0.220 | plastic | 1.659 | 21.220 | −13.023 |

TABLE 1a-continued

Implementation of FIG. 2
f = 3.565 mm, FNO = 1.98, FOV = 90°, TTL = 5.04 mm

| Surface number | Surface name | Surface type | Radius of curvature (mm) | Thickness (mm) | Material | Refractive index | Abbe number | Focal length (mm) |
|---|---|---|---|---|---|---|---|---|
| S6 | lens | aspheric | −9.227 | 0.170 | | | | |
| S7 | Fourth | aspheric | −17.297 | 0.352 | plastic | 1.671 | 20.390 | −13.383 |
| S8 | lens | aspheric | 19.183 | 0.212 | | | | |
| S9 | Fifth lens | aspheric | −5.003 | 0.750 | plastic | 1.578 | 34.300 | 2.659 |
| S10 | | aspheric | −1.246 | 0.095 | | | | |
| S11 | Sixth lens | aspheric | −5.855 | 0.306 | plastic | 1.671 | 20.390 | −5.391 |
| S12 | | aspheric | 9.896 | 0.348 | | | | |
| S13 | Seventh | aspheric | 1.215 | 0.408 | plastic | 1.563 | 39.240 | −6.543 |
| S14 | lens | aspheric | 0.804 | 0.506 | | | | |
| S15 | Infrared | spheric | Infinity | 0.234 | glass | 1.517 | 64.167 | |
| S16 | cut-off filter | spheric | Infinity | 0.386 | | | | |
| S17 | Imaging surface | spheric | Infinity | 0.000 | | | | |

Note:
a reference wavelength is 555 nm

In Table 1a, f represents an effective focal length of the optical system, FNO represents an F-number of the optical system, FOV represents an angle of view of the optical system diagonally, and TTL represents a distance on the optical axis from the object-side surface of the first lens to the imaging surface of the optical system.

Table 1b shows high-order coefficients A4, A6, A8, A10, A12, A14, A16, A18, and A20 which are applicable to each of the aspheric lens surfaces S1, S2, S3, S4, S5, S6, S7, S8, S9, S10, S11, and S12 of the implementation of FIG. 2.

TABLE 1b

Implementation of FIG. 2
Aspheric coefficients

| Surface number | S1 | S2 | S3 | S4 | S5 | S6 | S7 |
|---|---|---|---|---|---|---|---|
| K | −5.4635E−01 | 2.1177E+01 | 9.9000E+01 | 3.8413E+00 | 6.7267E−01 | −2.9540E+00 | 9.9000E+01 |
| A4 | −1.0873E−03 | −2.6947E−02 | −4.3175E−02 | −5.5636E−02 | −1.5460E−02 | 1.1055E−02 | −1.3355E−01 |
| A6 | −7.2443E−02 | −2.5124E−01 | −3.3378E−02 | −1.7834E−02 | 2.7862E−01 | −6.9698E−02 | −2.1894E−02 |
| A8 | 8.2285E−01 | 1.9177E+00 | 1.1413E−01 | 1.1703E−01 | −2.2147E+00 | 3.5719E−01 | −2.4512E−01 |
| A10 | −5.0089E+00 | −9.5428E+00 | −1.9767E−01 | −3.3500E−01 | 9.9082E+00 | −1.4683E+00 | 1.4509E+00 |
| A12 | 1.6575E+01 | 2.8894E+01 | 1.7213E−01 | 5.3756E−01 | −2.7255E+01 | 3.8535E+00 | −4.8166E+00 |
| A14 | −3.2371E+01 | −5.4270E+01 | −1.5959E−02 | −4.5899E−01 | 4.7116E+01 | −5.9581E+00 | 9.3781E+00 |
| A16 | 3.7028E+01 | 6.1446E+01 | −1.3668E−02 | 1.5660E−01 | −4.9938E+01 | 5.2251E+00 | −1.0482E+01 |
| A18 | −2.2985E+01 | −3.8285E+01 | 0.0000E+00 | 0.0000E+00 | 2.9623E+01 | −2.3906E+00 | 6.2011E+00 |
| A20 | 5.9809E+00 | 1.0080E+01 | 0.0000E+00 | 0.0000E+00 | −7.5178E+00 | 4.4046E−01 | −1.5008E+00 |

| Surface number | S8 | S9 | S10 | S11 | S12 | S13 | S14 |
|---|---|---|---|---|---|---|---|
| K | −7.2615E+01 | 8.9781E+00 | −2.8204E+00 | −9.9000E+01 | 1.3007E+01 | −7.6415E+00 | −3.5620E+00 |
| A4 | −1.0099E−01 | −1.1043E−01 | −1.3372E−01 | 1.9050E−01 | 1.9848E−01 | −2.2474E−02 | −6.5706E−02 |
| A6 | −1.6942E−02 | −6.9817E−02 | 2.5462E−01 | −8.9014E−02 | −1.1922E−01 | −1.1306E−01 | −8.1754E−03 |
| A8 | 3.6410E−01 | 9.6642E−01 | −4.3073E−01 | −6.3446E−02 | 9.1394E−02 | 1.0154E−01 | 2.0629E−02 |
| A10 | −1.0168E+00 | −2.1536E+00 | 5.5136E−01 | 9.9996E−02 | −2.9585E−02 | −4.8364E−02 | −1.1205E−02 |
| A12 | 1.4948E+00 | 2.6075E+00 | −5.0263E−01 | −6.3673E−02 | 6.3377E−03 | 1.4261E−02 | 3.2745E−03 |
| A14 | −1.3117E+00 | −1.9606E+00 | 3.0465E−01 | 2.3915E−02 | −8.2164E−04 | −2.6125E−03 | −5.6374E−04 |
| A16 | 6.8851E−01 | 9.1760E−01 | −1.1405E−01 | −5.4132E−03 | 5.2914E−05 | 2.8784E−04 | 5.6834E−05 |
| A18 | −2.0080E−01 | −2.4743E−01 | 2.3526E−02 | 6.7975E−04 | −4.8057E−07 | −1.7448E−05 | −3.0959E−06 |
| A20 | 2.5506E−02 | 2.9682E−02 | −2.0138E−03 | −3.6269E−05 | −7.9295E−08 | 4.4710E−07 | 7.0228E−08 |

Figure 3:
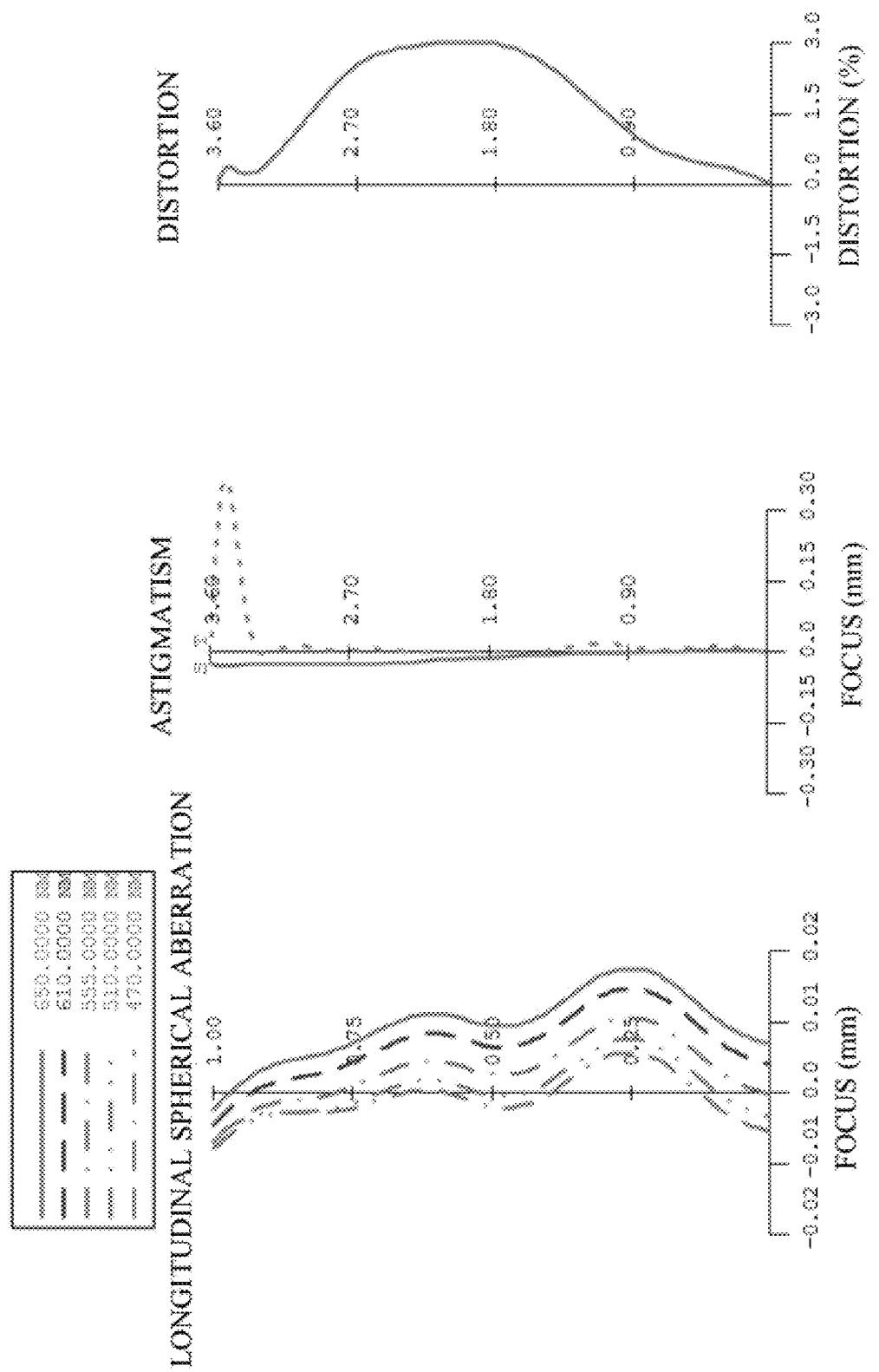
FIG. 3 illustrates a longitudinal spherical aberration curve, an astigmatic curve, and a distortion curve of the optical system of FIG. 2.

FIG. 3 shows a longitudinal spherical aberration curve, an astigmatic curve, and a distortion curve of the optical system according to the implementation of FIG. 2. The longitudinal spherical aberration curve represents deviation in focal point of rays with different wavelengths after the rays go through the lenses of the optical system. The astigmatic curve represents tangential image plane bending and sagittal image plane bending. The distortion curve represents distortion values corresponding to different angles of view. As can be seen in FIG. 3, the optical system in the implementation of FIG. 2 has high imaging quality.

Figure 4:
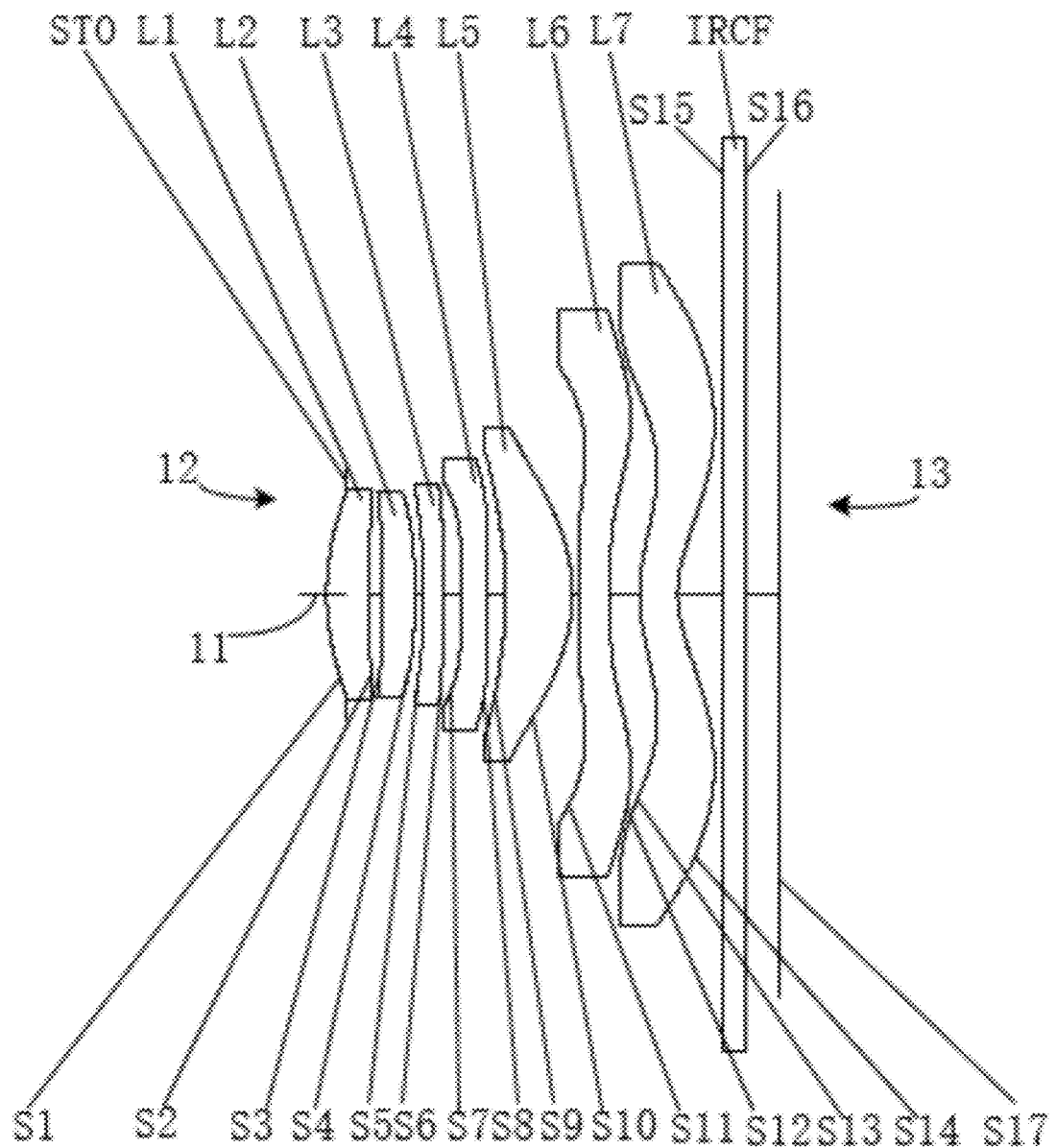
FIG. 4 is a schematic structural diagram of an optical system according to an implementation of this disclosure.

In FIG. 4, a straight line 11 represents an optical axis. A side of a first lens L1 away from a second lens L2 is an object side 12. A side of a seventh lens L7 away from a sixth lens L6 is an image side 13. An optical system of this implementation includes, from the object side 12 to the image side 13, a stop STO, the first lens L1, the second lens L2, a third lens L3, a fourth lens L4, a fifth lens L5, the sixth lens L6, the seventh lens L7, and an IRCF. At least one of an object-side surface or an image-side surface of the seventh lens L7 has an inflection point.

The first lens L1 with a positive refractive power is made of plastic. An object-side surface S1 is convex at the optical axis and at a periphery. An image-side surface S2 is concave at the optical axis and convex at the periphery. Both the object-side surface S1 and the image-side surface S2 of the first lens L1 are aspheric.

The second lens L2 with a positive refractive power is made of plastic. An object-side surface S3 is concave at the optical axis and at the periphery. An image-side surface S4 is convex at the optical axis and at the periphery. Both the object-side surface S3 and the image-side surface S4 of the second lens L2 are aspheric.

The third lens L3 with a negative refractive power is made of plastic. An object-side surface S5 is concave at the optical axis and at the periphery. An image-side surface S6 is convex at the optical axis and at the periphery. Both the object-side surface S5 and the image-side surface S6 of the third lens L3 are aspheric.

The fourth lens L4 with a negative refractive power is made of plastic. An object-side surface S7 is concave at the optical axis and at the periphery. An image-side surface S8 is concave at the optical axis and convex at the periphery.

Both the object-side surface S7 and the image-side surface S8 of the fourth lens L4 are aspheric.

The fifth lens L5 with a positive refractive power is made of plastic. An object-side surface S9 is concave at the optical axis and at the periphery. An image-side surface S10 is convex at the optical axis and at the periphery. Both the object-side surface S9 and the image-side surface S10 of the fifth lens L5 are aspheric.

The sixth lens L6 with a negative refractive power is made of plastic. An object-side surface S11 is concave at the optical axis and at the periphery. An image-side surface S12 is concave at the optical axis and convex at the periphery. Both the object-side surface S11 and the image-side surface S12 of the sixth lens L6 are aspheric.

The seventh lens L7 with a negative refractive power is made of plastic. An object-side surface S13 is convex at the optical axis and at the periphery. An image-side surface S14 is concave at the optical axis and convex at the periphery. Both the object-side surface S13 and the image-side surface S14 of the seventh lens L7 are aspheric.

The stop STO may be located between the object side of the optical system and the seventh lens L7. In this implementation, the stop STO is disposed at one side of the first lens L1 away from the second lens L2 to control the amount of light passed.

The IRCF is disposed after the seventh lens L7. The IRCF has an object-side surface S15 and an image-side surface S16. The IRCF is configured to filter out the infrared light so that the light incident onto the imaging surface is visible light. Visible light has a wavelength ranging from 380 nm to 780 nm. The IRCF is made of glass.

An imaging surface S17 is the surface where an image formed by the light of the photographed object after going through the optical system is located.

Table 2a illustrates characteristics of the optical system in this implementation.

TABLE 2a

Implementation of FIG. 4
f = 3.43 mm, FNO = 1.85, FOV = 92.2°, TTL = 4.926 mm

| Surface number | Surface name | Surface type | Radius of curvature (mm) | Thickness (mm) | Material | Refractive index | Abbe number | Focal Length (mm) |
|---|---|---|---|---|---|---|---|---|
| Object surface | Object surface | spheric | Infinity | 450.509 | | | | |
| STO | Stop | spheric | Infinity | −0.209 | | | | |
| S1 | First lens | aspheric | 1.897 | 0.457 | plastic | 1.544 | 56.114 | 4.58 |
| S2 | | aspheric | 7.207 | 0.149 | | | | |
| S3 | Second lens | aspheric | −20.203 | 0.357 | plastic | 1.535 | 55.660 | 9.97 |
| S4 | | aspheric | −4.257 | 0.096 | | | | |
| S5 | Third lens | aspheric | −4.607 | 0.222 | plastic | 1.655 | 21.510 | −15.97 |
| S6 | | aspheric | −8.335 | 0.187 | | | | |
| S7 | Fourth lens | aspheric | −16.021 | 0.285 | plastic | 1.670 | 20.510 | −13.41 |
| S8 | | aspheric | 20.989 | 0.188 | | | | |
| S9 | Fifth lens | aspheric | −5.043 | 0.735 | plastic | 1.567 | 37.720 | 2.75 |
| S10 | | aspheric | −1.258 | 0.083 | | | | |
| S11 | Sixth lens | aspheric | −5.528 | 0.318 | plastic | 1.671 | 20.670 | −5.25 |
| S12 | | aspheric | 10.005 | 0.328 | | | | |
| S13 | Seventh lens | aspheric | 1.191 | 0.414 | plastic | 1.534 | 55.770 | −8.85 |
| S14 | | aspheric | 0.836 | 0.493 | | | | |
| S15 | Infrared cut-off filter | spheric | Infinity | 0.237 | glass | 1.517 | 64.167 | |
| S16 | | spheric | Infinity | 0.377 | | | | |
| S17 | Imaging surface | spheric | Infinity | 0.000 | | | | |

Note:
a reference wavelength is 555 nm

In Table 2a, f represents an effective focal length of the optical system, FNO represents an F-number of the optical system, FOV represents an angle of view of the optical system diagonally, and TTL represents a distance on the optical axis from the object-side surface of the first lens to the imaging surface of the optical system.

Table 2b shows high-order coefficients A4, A6, A8, A10, A12, A14, A16, A18, and A20 which are applicable to each of the aspheric lens surfaces S1, S2, S3, S4, S5, S6, S7, S8, S9, S10, S11, and S12 of the implementation of FIG. 4.

TABLE 2b

Implementation of FIG. 4
Aspheric coefficients

| Surface number | S1 | S2 | S3 | S4 | S5 | S6 | S7 |
|---|---|---|---|---|---|---|---|
| K | −5.3689E−01 | 2.0878E+01 | 9.6293E+01 | 3.0802E+00 | 5.0424E−01 | −3.4866E−02 | 8.9688E+01 |
| A4 | 6.3921E−04 | −1.0081E−02 | −3.8496E−02 | −5.1517E−02 | 2.1258E−02 | 3.7470E−03 | −1.1109E−01 |
| A6 | −1.6885E−01 | −4.1839E−01 | −1.5909E−01 | −1.3782E−02 | −3.3378E−01 | −6.5919E−02 | −2.3479E−01 |
| A8 | 1.5894E+00 | 2.4711E+00 | 1.0358E+00 | 5.6641E−02 | 2.3770E+00 | 3.5709E−01 | 8.7223E−01 |
| A10 | −7.7578E+00 | −8.9400E+00 | −3.6048E+00 | 1.2766E−01 | −9.8492E+00 | −9.3915E−01 | −2.0383E+00 |
| A12 | 2.1347E+01 | 1.9732E+01 | 7.2464E+00 | −1.0705E+00 | 2.5235E+01 | 1.3488E+00 | 2.5648E+00 |
| A14 | −3.5081E+01 | −2.7111E+01 | −8.2539E+00 | 2.5463E+00 | −4.0402E+01 | −9.8681E−01 | −1.3458E+00 |
| A16 | 3.4068E+01 | 2.2570E+01 | 4.8328E+00 | −2.9744E+00 | 3.9292E+01 | 1.7390E−01 | −4.2193E−01 |
| A18 | −1.8076E+01 | −1.0389E+01 | −9.3008E−01 | 1.7250E+00 | −2.1220E+01 | 2.0198E−01 | 8.2208E−01 |
| A20 | 4.0442E+00 | 2.0338E+00 | −1.5362E−01 | −3.9554E−01 | 4.8816E+00 | −9.3593E−02 | −2.6990E−01 |

| Surface number | S8 | S9 | S10 | S11 | S12 | S13 | S14 |
|---|---|---|---|---|---|---|---|
| K | −9.8711E+01 | 8.7938E+00 | −3.0442E+00 | −9.9000E+01 | 1.3068E+01 | −7.7362E+00 | −3.8444E+00 |
| A4 | −1.0277E−01 | −1.0609E−01 | −1.0855E−01 | 2.0087E−01 | 2.0344E−01 | −3.0309E−02 | −5.8699E−02 |
| A6 | −4.3106E−02 | −7.8549E−02 | 1.1087E−01 | −1.1837E−01 | −1.8946E−01 | −8.4216E−02 | −1.3442E−02 |
| A8 | 3.0673E−01 | 8.8727E−01 | −4.5295E−02 | −1.7145E−02 | 8.5058E−02 | 7.7109E−02 | 2.3117E−02 |
| A10 | −5.9403E−01 | −1.8811E+00 | −2.8468E−02 | 5.0844E−02 | −2.3649E−02 | −3.6395E−02 | −1.2158E−02 |
| A12 | 6.4311E−01 | 2.2557E+00 | 2.0730E−02 | −3.1143E−02 | 3.8317E−03 | 1.0439E−02 | 3.5186E−03 |
| A14 | −4.5154E−01 | −1.7375E+00 | 2.0825E−02 | 1.0897E−02 | −2.4445E−04 | −1.8343E−03 | −6.0175E−04 |
| A16 | 2.1320E−01 | 8.4977E−01 | −2.4776E−02 | −2.3405E−03 | −2.1733E−05 | 1.9207E−04 | 6.0373E−05 |
| A18 | −6.4216E−02 | −2.4033E−01 | 9.0203E−03 | 2.8554E−04 | 4.5869E−06 | −1.1002E−05 | −3.2839E−06 |
| A20 | 9.7438E−03 | 2.9917E−02 | −1.1503E−03 | −1.5058E−05 | −2.1861E−07 | 2.6548E−07 | 7.4756E−08 |

Figure 5:
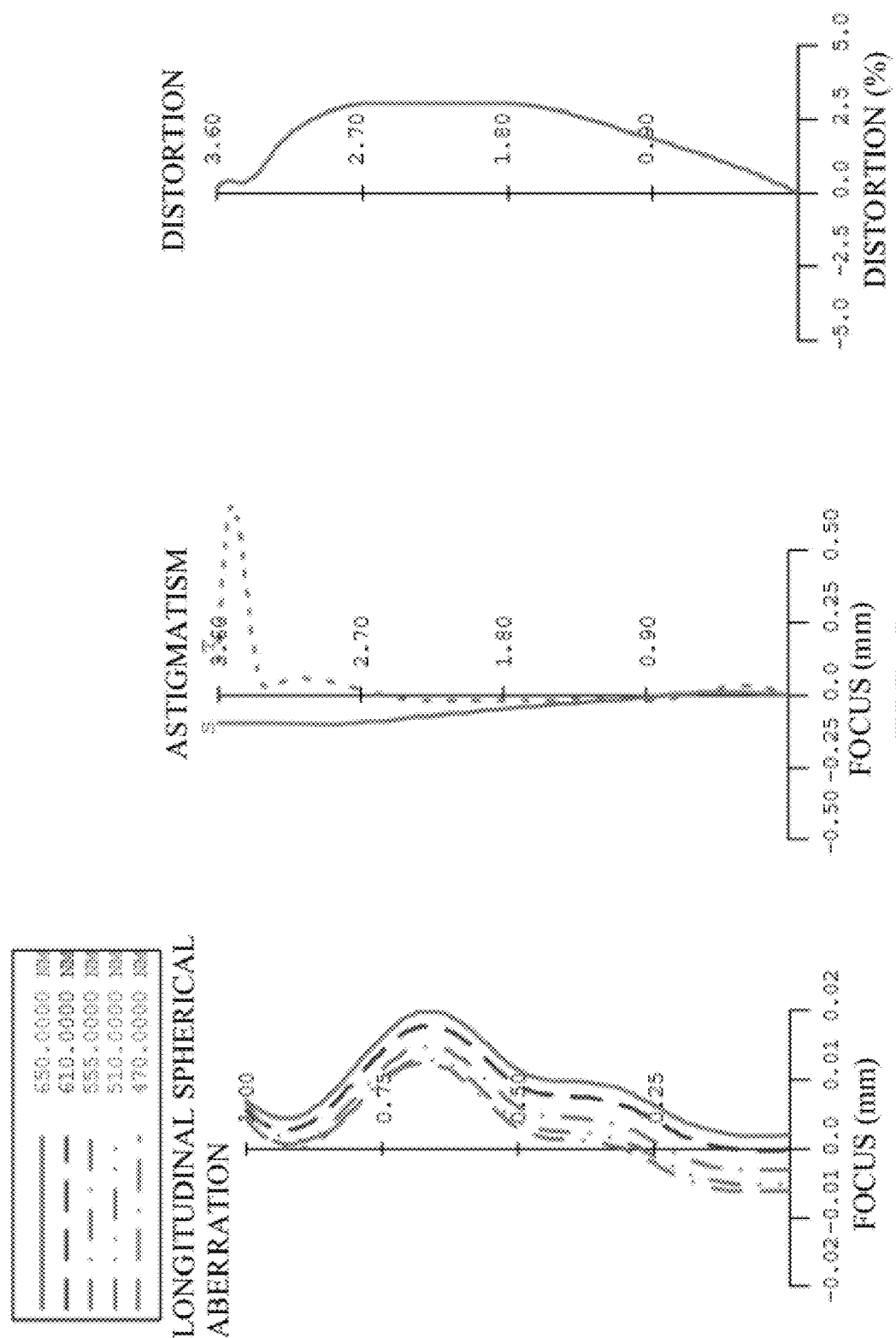
FIG. 5 illustrates a longitudinal spherical aberration curve, an astigmatic curve, and a distortion curve of the optical system of FIG. 4.

FIG. 5 shows a longitudinal spherical aberration curve, an astigmatic curve, and a distortion curve of the optical system according to the implementation of FIG. 4. The longitudinal spherical aberration curve represents deviation in focal point of rays with different wavelengths after the rays go through the lenses of the optical system. The astigmatic curve represents tangential image plane bending and sagittal image plane bending. The distortion curve represents distortion values corresponding to different angles of view. As can be seen in FIG. 5, the optical system in the implementation of FIG. 4 has high imaging quality.

Figure 6:
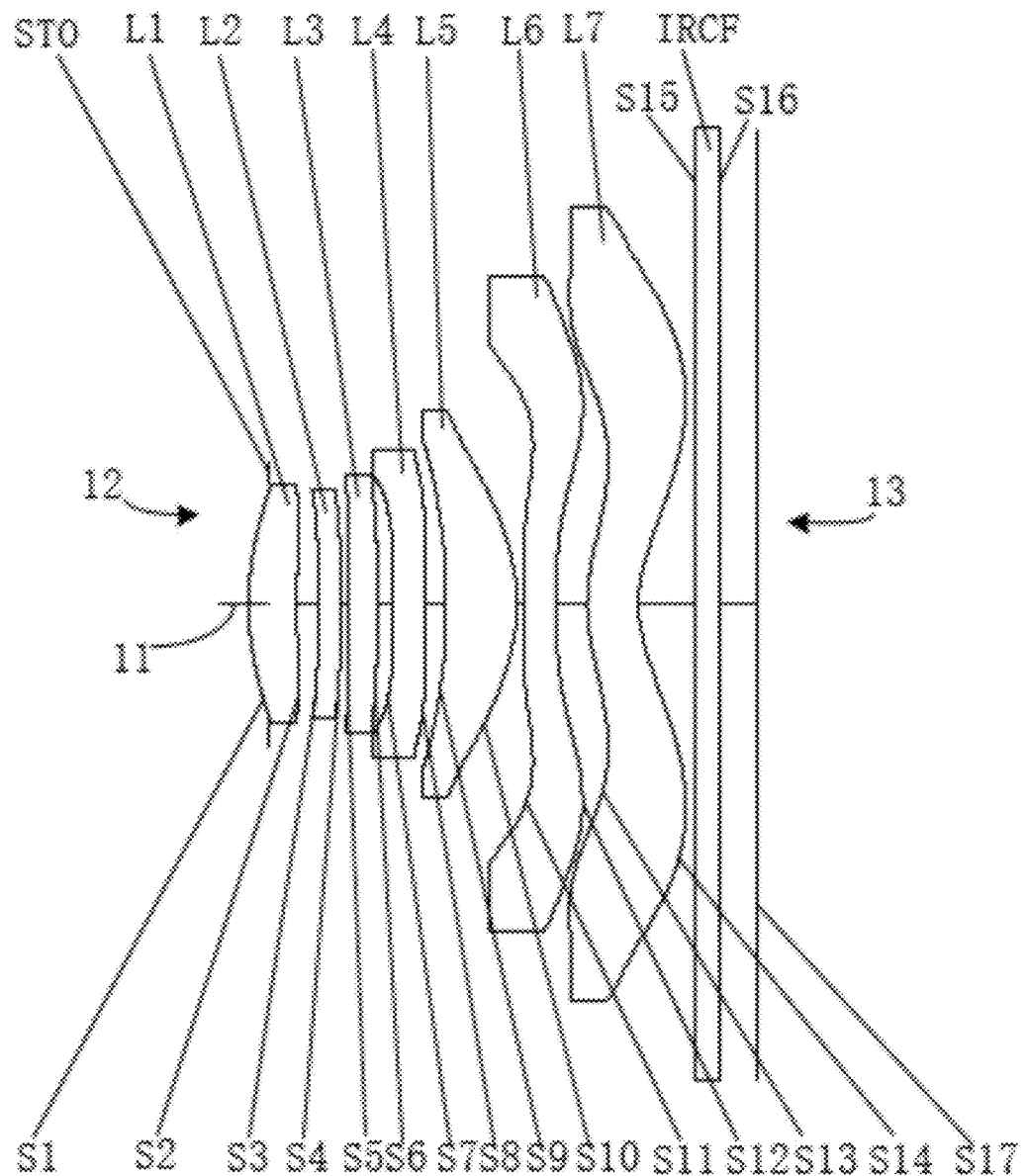
FIG. 6 is a schematic structural diagram of an optical system according to an implementation of this disclosure.

In FIG. 6, a straight line 11 represents an optical axis. A side of a first lens L1 away from a second lens L2 is an object side 12. A side of a seventh lens L7 away from a sixth lens L6 is an image side 13. An optical system of this implementation includes, from the object side 12 to the image side 13, a stop STO, the first lens L1, the second lens L2, a third lens L3, a fourth lens L4, a fifth lens L5, the sixth lens L6, the seventh lens L7, and an IRCF. At least one of an object-side surface or an image-side surface of the seventh lens L7 has an inflection point.

The first lens L1 with a positive refractive power is made of plastic. An object-side surface S1 is convex at the optical axis and at a periphery. An image-side surface S2 is concave at the optical axis and convex at the periphery. Both the object-side surface S1 and the image-side surface S2 of the first lens L1 are aspheric.

The second lens L2 with a negative refractive power is made of plastic. An object-side surface S3 is concave at the optical axis and at the periphery. An image-side surface S4 is convex at the optical axis and at the periphery. Both the object-side surface S3 and the image-side surface S4 of the second lens L2 are aspheric.

The third lens L3 with a positive refractive power is made of plastic. An object-side surface S5 is concave at the optical axis and at the periphery. An image-side surface S6 is convex at the optical axis and at the periphery. Both the object-side surface S5 and the image-side surface S6 of the third lens L3 are aspheric.

The fourth lens L4 with a negative refractive power is made of plastic. An object-side surface S7 is concave at the optical axis and at the periphery. An image-side surface S8 is concave at the optical axis and convex at the periphery. Both the object-side surface S7 and the image-side surface S8 of the fourth lens L4 are aspheric.

The fifth lens L5 with a positive refractive power is made of plastic. An object-side surface S9 is concave at the optical axis and at the periphery. An image-side surface S10 is convex at the optical axis and at the periphery. Both the object-side surface S9 and the image-side surface S10 of the fifth lens L5 are aspheric.

The sixth lens L6 with a negative refractive power is made of plastic. An object-side surface S11 is concave at the optical axis and at the periphery. An image-side surface S12 is concave at the optical axis and convex at the periphery. Both the object-side surface S11 and the image-side surface S12 of the sixth lens L6 are aspheric.

The seventh lens L7 with a negative refractive power is made of plastic. An object-side surface S13 is convex at the optical axis and concave at the periphery. An image-side surface S14 is concave at the optical axis and convex at the periphery. Both the object-side surface S13 and the image-side surface S14 of the seventh lens L7 are aspheric.

The stop STO may be located between the object side of the optical system and the seventh lens L7. In this implementation, the stop STO is disposed at one side of the first lens L1 away from the second lens L2 to control the amount of light passed.

The IRCF is disposed after the seventh lens L7. The IRCF has an object-side surface S15 and an image-side surface S16. The IRCF is configured to filter out the infrared light so that the light incident onto the imaging surface is visible light. Visible light has a wavelength ranging from 380 nm to 780 nm. The IRCF is made of glass.

An imaging surface S17 is the surface where an image formed by the light of the photographed object after going through the optical system is located.

Table 3a illustrates characteristics of the optical system in this implementation.

TABLE 3a

Implementation of FIG. 6
f = 3.56mm, FNO = 1.8, FOV = 96°, TTL = 5.073 mm

| Surface number | Surface name | Surface type | Radius of curvature (mm) | Thickness (mm) | Material | Refractive index | Abbe number | Focal length (mm) |
|---|---|---|---|---|---|---|---|---|
| Object surface | Object surface | spheric | Infinity | 4.00E+02 | | | | |
| STO | Stop | spheric | Infinity | −0.190 | | | | |
| S1 | First lens | aspheric | 2.086 | 0.485 | plastic | 1.544 | 56.114 | 4.61 |
| S2 | | aspheric | 11.203 | 0.215 | | | | |
| S3 | Second lens | aspheric | −12.629 | 0.221 | plastic | 1.537 | 53.770 | −100.00 |
| S4 | | aspheric | −16.594 | 0.081 | | | | |
| S5 | Third lens | aspheric | −22.440 | 0.294 | plastic | 1.535 | 55.790 | 26.90 |
| S6 | | aspheric | −8.825 | 0.153 | | | | |
| S7 | Fourth lens | aspheric | −30.053 | 0.310 | plastic | 1.671 | 20.390 | −15.36 |
| S8 | | aspheric | 15.961 | 0.213 | | | | |
| S9 | Fifth lens | aspheric | −6.053 | 0.709 | plastic | 1.557 | 39.650 | 3.33 |
| S10 | | aspheric | −1.484 | 0.080 | | | | |
| S11 | Sixth lens | aspheric | −7.352 | 0.313 | plastic | 1.671 | 20.390 | −6.34 |
| S12 | | aspheric | 10.489 | 0.311 | | | | |
| S13 | Seventh lens | aspheric | 1.257 | 0.509 | plastic | 1.534 | 55.770 | −10.12 |
| S14 | | aspheric | 0.877 | 0.559 | | | | |
| S15 | Infrared cut-off filter | spheric | Infinity | 0.265 | glass | 1.517 | 64.167 | |
| S16 | | spheric | Infinity | 0.354 | | | | |
| S17 | Imaging surface | spheric | Infinity | 0.000 | | | | |

Note:
a reference wavelength is 555 nm

In Table 3a, f represents an effective focal length of the optical system, FNO represents an F-number of the optical system, FOV represents an angle of view of the optical system diagonally, and TTL represents a distance on the optical axis from the object-side surface of the first lens to the imaging surface of the optical system.

Table 3b shows high-order coefficients A4, A6, A8, A10, A12, A14, A16, A18, and A20 which are applicable to each of the aspheric lens surfaces S1, S2, S3, S4, S5, S6, S7, S8, S9, S10, S11, and S12 of the implementation of FIG. 6.

TABLE 3b

Implementation of FIG. 6
Aspheric coefficients

| Surface number | S1 | S2 | S3 | S4 | S5 | S6 | S7 |
|---|---|---|---|---|---|---|---|
| K | −8.1085E−01 | −2.0400E+01 | 9.7271E+01 | 2.5148E+01 | 1.8895E+01 | 3.1258E+00 | 9.9000E+01 |
| A4 | −1.0766E−02 | −8.1923E−03 | −2.6063E−02 | −3.5054E−02 | 2.9264E−03 | 5.4085E−03 | −9.1459E−02 |
| A6 | 4.6334E−02 | −2.2921E−01 | −7.8459E−03 | −1.2945E−02 | −1.1292E−02 | −3.2528E−03 | 8.1784E−02 |
| A8 | −5.0079E−02 | 1.1912E+00 | 4.3199E−02 | 1.1454E−01 | −3.9999E−02 | −2.1814E−01 | −1.0636E+00 |
| A10 | −6.2527E−01 | −3.9521E+00 | 2.4462E−02 | −2.5688E−01 | 3.3185E−01 | 1.0723E+00 | 4.1022E+00 |
| A12 | 2.7057E+00 | 8.1877E+00 | −1.9692E−01 | 2.7188E−01 | −8.4338E−01 | −2.4367E+00 | −8.7022E+00 |
| A14 | −5.1910E+00 | −1.0819E+01 | 2.0672E−01 | −1.7772E−01 | 1.0265E+00 | 3.1462E+00 | 1.1104E+01 |
| A16 | 5.3334E+00 | 8.8131E+00 | −7.4333E−02 | 4.9681E−02 | −5.7376E−01 | −2.3669E+00 | −8.5013E+00 |
| A18 | −2.8629E+00 | −4.0262E+00 | 0.0000E+00 | 0.0000E+00 | 7.2025E−02 | 9.6445E−01 | 3.5933E+00 |
| A20 | 6.3120E−01 | 7.8727E−01 | 0.0000E+00 | 0.0000E+00 | 3.5244E−02 | −1.6391E−01 | −6.4315E−01 |

| Surface number | S8 | S9 | S10 | S11 | S12 | S13 | S14 |
|---|---|---|---|---|---|---|---|
| K | 8.1430E+01 | 1.0696E+01 | −3.1648E+00 | −8.2841E+01 | 1.0054E+01 | −6.9660E+00 | −3.8519E+00 |
| A4 | −6.2348E−02 | −8.6712E−02 | −1.2318E−01 | 1.9996E−01 | 1.7207E−01 | −4.2275E−02 | −4.1781E−02 |
| A6 | −2.0184E−02 | 3.3710E−02 | 2.0758E−01 | −1.2859E−01 | −1.2288E−01 | −2.7353E−02 | −3.5658E−03 |
| A8 | −1.2612E−01 | 1.2134E−01 | −2.6961E−01 | 2.8808E−02 | 3.6004E−02 | 2.1806E−02 | 8.0341E−03 |
| A10 | 6.1893E−01 | −7.4623E−02 | 2.5137E−01 | −3.1573E−04 | −4.0157E−03 | −8.6494E−03 | −3.8047E−03 |
| A12 | −1.1391E+00 | −1.5235E−01 | −1.5913E−01 | −1.4119E−03 | −6.4969E−04 | 2.1783E−03 | 9.4669E−04 |
| A14 | 1.1338E+00 | 2.4988E−01 | 6.3455E−02 | 3.6739E−04 | 2.8883E−04 | −3.3881E−04 | −1.3673E−04 |
| A16 | −6.4768E−01 | −1.5720E−01 | −1.4027E−02 | −5.5346E−05 | −4.1497E−05 | 3.1176E−05 | 1.1490E−05 |
| A18 | 2.0005E−01 | 4.7750E−02 | 1.3354E−03 | 7.0532E−06 | 2.8114E−06 | −1.5542E−06 | −5.2018E−07 |
| A20 | −2.5779E−02 | −5.8207E−03 | −1.4468E−05 | −5.1066E−07 | −7.5684E−08 | 3.2363E−08 | 9.7853E−09 |

Figure 7:
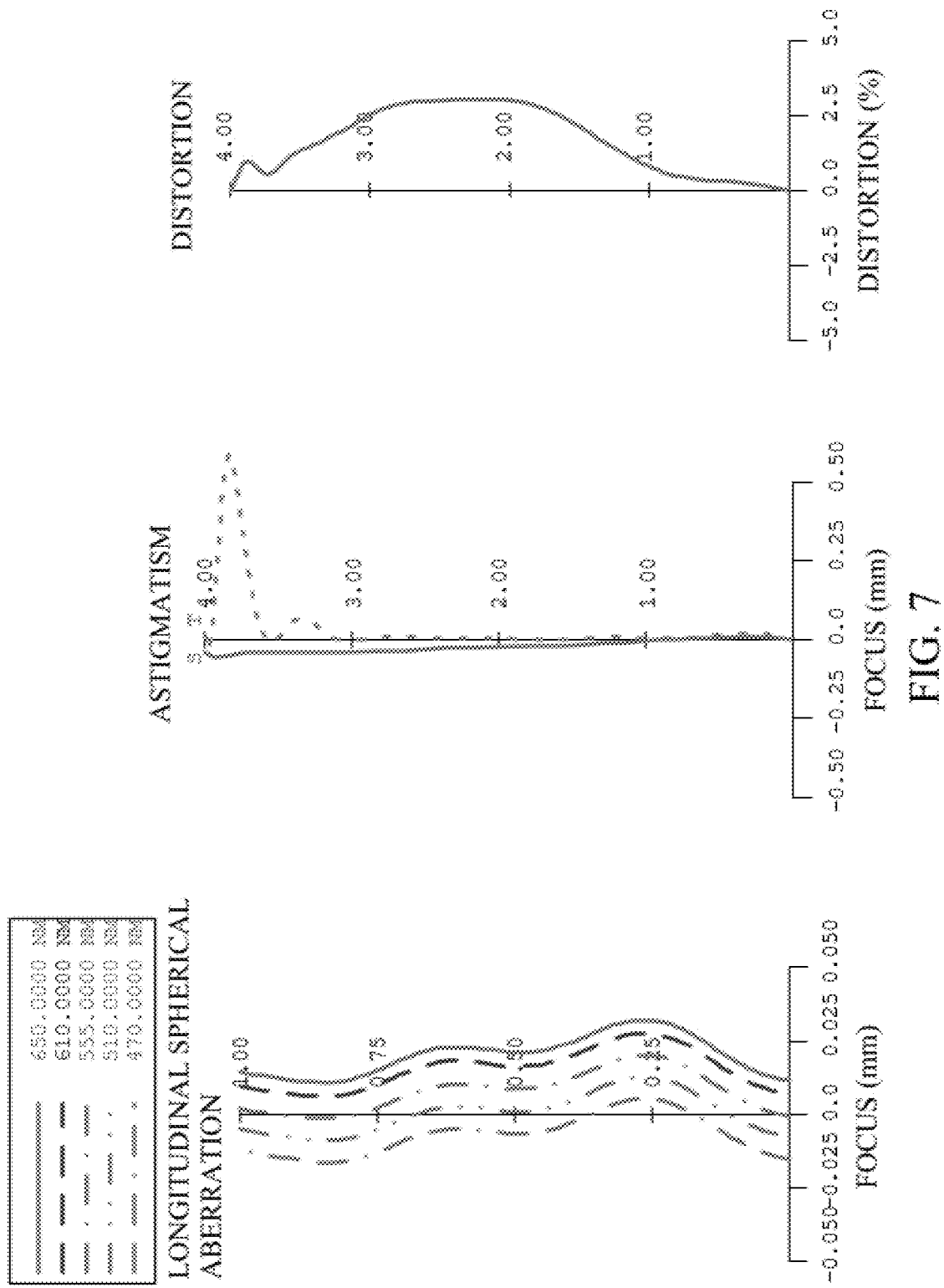
FIG. 7 illustrates a longitudinal spherical aberration curve, an astigmatic curve, and a distortion curve of the optical system of FIG. 6.

FIG. 7 shows a longitudinal spherical aberration curve, an astigmatic curve, and a distortion curve of the optical system according to the implementation of FIG. 6. The longitudinal spherical aberration curve represents deviation in focal point of rays with different wavelengths after the rays go through the lenses of the optical system. The astigmatic curve represents tangential image plane bending and sagittal image plane bending. The distortion curve represents distortion values corresponding to different angles of view. As can be seen in FIG. 7, the optical system in the implementation of FIG. 6 has high imaging quality.

Figure 8:
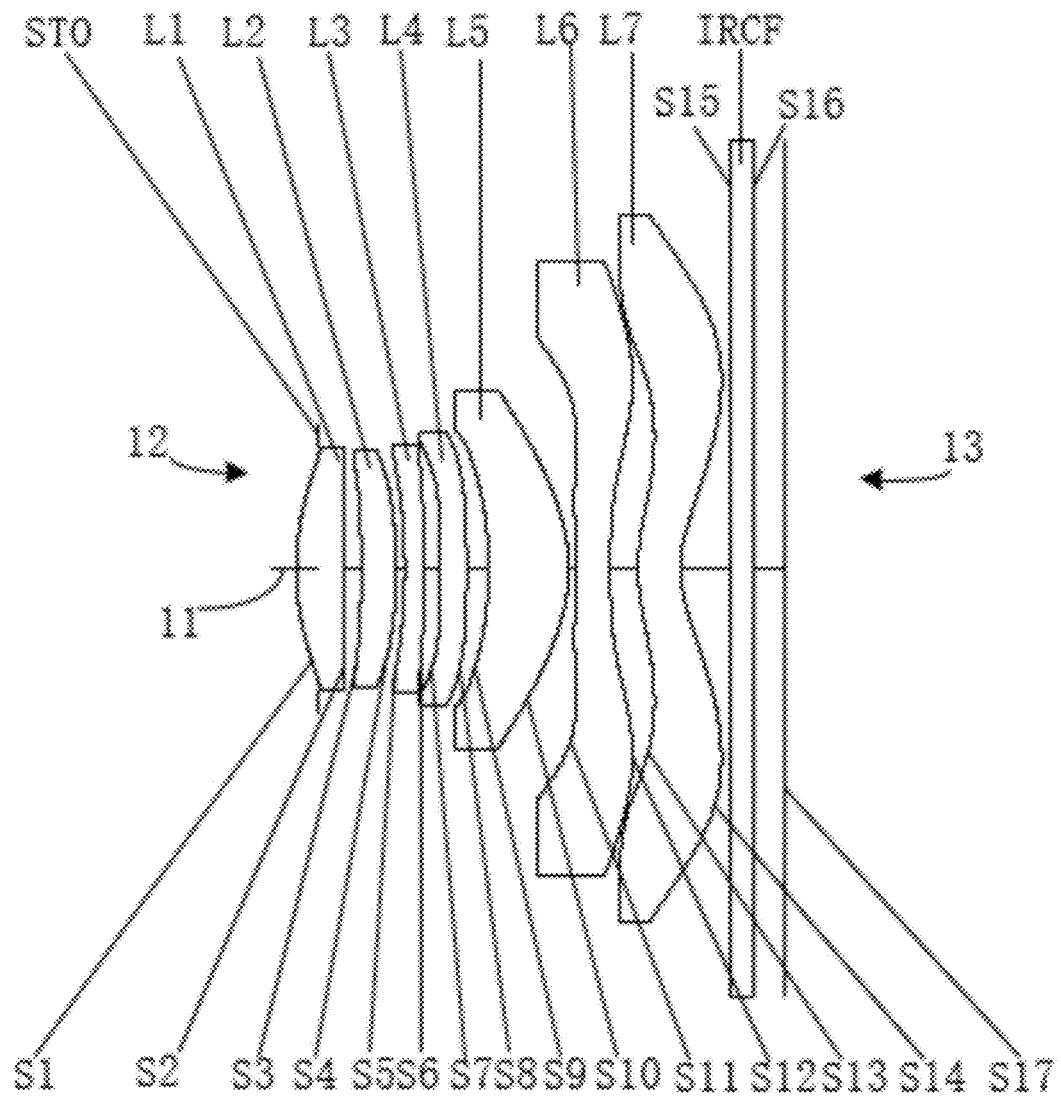
FIG. 8 is a schematic structural diagram of an optical system according to an implementation of this disclosure.

In FIG. 8, a straight line 11 represents an optical axis. A side of a first lens L1 away from a second lens L2 is an object side 12. A side of a seventh lens L7 away from a sixth lens L6 is an image side 13. An optical system of this implementation includes, from the object side 12 to the image side 13, a stop STO, the first lens L1, the second lens L2, a third lens L3, a fourth lens L4, a fifth lens L5, the sixth lens L6, the seventh lens L7, and an IRCF. At least one of an object-side surface or an image-side surface of the seventh lens L7 has an inflection point.

The first lens L1 with a positive refractive power is made of plastic. An object-side surface S1 is convex at the optical axis and at a periphery. An image-side surface S2 is concave at the optical axis and convex at the periphery. Both the object-side surface S1 and the image-side surface S2 of the first lens L1 are aspheric.

The second lens L2 with a positive refractive power is made of plastic. An object-side surface S3 is concave at the optical axis and at the periphery. An image-side surface S4 is convex at the optical axis and at the periphery. Both the object-side surface S3 and the image-side surface S4 of the second lens L2 are aspheric.

The third lens L3 with a negative refractive power is made of plastic. An object-side surface S5 is concave at the optical axis and at the periphery. An image-side surface S6 is convex at the optical axis and at the periphery. Both the object-side surface S5 and the image-side surface S6 of the third lens L3 are aspheric.

The fourth lens L4 with a positive refractive power is made of plastic. An object-side surface S7 is concave at the optical axis and at the periphery. An image-side surface S8 is convex at the optical axis and at the periphery. Both the object-side surface S7 and the image-side surface S8 of the fourth lens L4 are aspheric.

The fifth lens L5 with a positive refractive power is made of plastic. An object-side surface S9 is concave at the optical axis and at the periphery. An image-side surface S10 is convex at the optical axis and at the periphery. Both the object-side surface S9 and the image-side surface S10 of the fifth lens L5 are aspheric.

The sixth lens L6 with a negative refractive power is made of plastic. An object-side surface S11 is concave at the optical axis and at the periphery. An image-side surface S12 is concave at the optical axis and convex at the periphery. Both the object-side surface S11 and the image-side surface S12 of the sixth lens L6 are aspheric.

The seventh lens L7 with a negative refractive power is made of plastic. An object-side surface S13 is convex at the optical axis and concave at the periphery. An image-side surface S14 is concave at the optical axis and convex at the periphery. Both the object-side surface S13 and the image-side surface S14 of the seventh lens L7 are aspheric.

The stop STO may be located between the object side of the optical system and the seventh lens L7. In this implementation, the stop STO is disposed at one side of the first lens L1 away from the second lens L2 to control the amount of light passed.

The IRCF is disposed after the seventh lens L7. The IRCF has an object-side surface S15 and an image-side surface S16. The IRCF is configured to filter out the infrared light so that the light incident onto the imaging surface is visible light. Visible light has a wavelength ranging from 380 nm to 780 nm. The IRCF is made of glass.

An imaging surface S17 is the surface where an image formed by the light of the photographed object after going through the optical system is located.

Table 4a illustrates characteristics of the optical system in this implementation.

TABLE 4a

Implementation of FIG. 8
f = 3.9 mm, FNO = 1.75, FOV = 91°, TTL = 5.411 mm

| Surface number | Surface name | Surface type | Radius of curvature (mm) | Thickness (mm) | Material | Refractive index | Abbe number | Focal Length (mm) |
|---|---|---|---|---|---|---|---|---|
| Object surface | Object surface | spheric | Infinity | 5.02E+02 | | | | |
| STO | Stop | spheric | Infinity | −0.249 | | | | |
| S1 | First lens | aspheric | 2.093 | 0.526 | plastic | 1.544 | 56.114 | 4.62 |
| S2 | | aspheric | 11.226 | 0.189 | | | | |
| S3 | Second lens | aspheric | −12.677 | 0.389 | plastic | 1.535 | 55.790 | 11.77 |
| S4 | | aspheric | −4.262 | 0.094 | | | | |
| S5 | Third lens | aspheric | −4.602 | 0.220 | plastic | 1.671 | 20.390 | −13.85 |
| S6 | | aspheric | −9.213 | 0.175 | | | | |
| S7 | Fourth lens | aspheric | −26.768 | 0.290 | plastic | 1.671 | 20.390 | 96.35 |
| S8 | | aspheric | −19.062 | 0.243 | | | | |
| S9 | Fifth lens | aspheric | −3.863 | 0.892 | plastic | 1.573 | 35.910 | 3.20 |
| S10 | | aspheric | −1.352 | 0.080 | | | | |
| S11 | Sixth lens | aspheric | −4.516 | 0.378 | plastic | 1.671 | 20.390 | −4.69 |
| S12 | | aspheric | 11.077 | 0.308 | | | | |
| S13 | Seventh lens | aspheric | 1.440 | 0.474 | plastic | 1.534 | 55.770 | −6.80 |
| S14 | | aspheric | 0.913 | 0.545 | | | | |
| S15 | Infrared cut-off filter | spheric | Infinity | 0.264 | glass | 1.517 | 64.167 | |
| S16 | | spheric | Infinity | 0.344 | | | | |

TABLE 4a-continued

Implementation of FIG. 8
f = 3.9 mm, FNO = 1.75, FOV = 91°, TTL = 5.411 mm

| Surface number | Surface name | Surface type | Radius of curvature (mm) | Thickness (mm) | Material | Refractive index | Abbe number | Focal Length (mm) |
|---|---|---|---|---|---|---|---|---|
| S17 | Imaging surface | spheric | Infinity | 0.000 | | | | |

Note:
a reference wavelength is 555 nm

In Table 4a, f represents an effective focal length of the optical system, FNO represents an F-number of the optical system, FOV represents an angle of view of the optical system diagonally, and TTL represents a distance on the optical axis from the object-side surface of the first lens to the imaging surface of the optical system.

Table 4b shows high-order coefficients A4, A6, A8, A10, A12, A14, A16, A18, and A20 which are applicable to each of the aspheric lens surfaces S1, S2, S3, S4, S5, S6, S7, S8, S9, S10, S11, and S12 of the implementation of FIG. 8.

TABLE 4b

Implementation of FIG. 8
Aspheric coefficients

| Surface number | S1 | S2 | S3 | S4 | S5 | S6 | S7 |
|---|---|---|---|---|---|---|---|
| K | −6.2616E−01 | 2.1015E+01 | 8.7010E+01 | 4.3530E+00 | 7.2692E−02 | 2.4025E−02 | −9.7216E+01 |
| A4 | 4.0033E−03 | −2.0574E−02 | −3.0696E−02 | −3.3562E−02 | 1.3336E−03 | 4.9028E−03 | −8.6760E−02 |
| A6 | −1.1137E−01 | −1.3021E−01 | −4.0204E−02 | −6.6760E−02 | 1.8750E−02 | −1.7125E−02 | −7.0786E−02 |
| A8 | 7.0776E−01 | 6.5259E−01 | 1.8894E−01 | 2.8592E−01 | −2.7290E−01 | −1.9715E−02 | 3.4352E−01 |
| A10 | −2.5438E+00 | −2.0753E+00 | −4.0331E−01 | −5.6730E−01 | 1.2702E+00 | 2.1705E−01 | −1.1307E+00 |
| A12 | 5.2637E+00 | 4.0189E+00 | 4.8112E−01 | 5.9686E−01 | −3.0257E+00 | −5.0523E−01 | 2.2609E+00 |
| A14 | −6.5602E+00 | −4.8484E+00 | −3.0010E−01 | −3.2808E−01 | 4.1209E+00 | 5.7850E−01 | −2.8197E+00 |
| A16 | 4.8445E+00 | 3.5522E+00 | 7.8169E−02 | 7.3828E−02 | −3.2510E+00 | −3.5734E−01 | 2.1040E+00 |
| A18 | −1.9555E+00 | −1.4478E+00 | 0.0000E+00 | 0.0000E+00 | 1.3852E+00 | 1.1315E−01 | −8.5006E−01 |
| A20 | 3.3267E−01 | 2.5329E−01 | 0.0000E+00 | 0.0000E+00 | −2.4690E−01 | −1.4253E−02 | 1.4311E−01 |

| Surface number | S8 | S9 | S10 | S11 | S12 | S13 | S14 |
|---|---|---|---|---|---|---|---|
| K | 9.1335E+01 | 7.7234E+00 | −3.2458E+00 | −2.8897E+01 | 1.2769E+01 | −7.8109E+00 | −4.0327E+00 |
| A4 | −6.1108E−02 | −8.8376E−02 | −9.1355E−02 | 1.6144E−01 | 1.5242E−01 | −6.0160E−02 | −5.5101E−02 |
| A6 | −1.9691E−01 | −9.2995E−02 | 1.3867E−01 | −7.3254E−02 | −1.2157E−01 | −9.3298E−03 | 8.2926E−03 |
| A8 | 9.4927E−01 | 7.4110E−01 | −1.2801E−01 | −3.9116E−02 | 4.6369E−02 | 1.9155E−02 | 3.0001E−03 |
| A10 | −2.2287E+00 | −1.4459E+00 | 4.7604E−02 | 5.6095E−02 | −1.0667E−02 | −9.7708E−03 | −2.2039E−03 |
| A12 | 3.1946E+00 | 1.6377E+00 | 2.2383E−02 | −3.0040E−02 | 1.4197E−03 | 2.6443E−03 | 5.6993E−04 |
| A14 | −2.9051E+00 | −1.1757E+00 | −3.3293E−02 | 9.3315E−03 | −8.4315E−05 | −4.1222E−04 | −7.8718E−05 |
| A16 | 1.6176E+00 | 5.1425E−01 | 1.5511E−02 | −1.7536E−03 | −2.1653E−06 | 3.7154E−05 | 6.1504E−06 |
| A18 | −4.9929E−01 | −1.2179E−01 | −3.4050E−03 | 1.8507E−04 | 5.6767E−07 | −1.8037E−06 | −2.5601E−07 |
| A20 | 6.5167E−02 | 1.1544E−02 | 2.9695E−04 | −8.4033E−06 | −2.2081E−08 | 3.6578E−08 | 4.4041E−09 |

Figure 9:
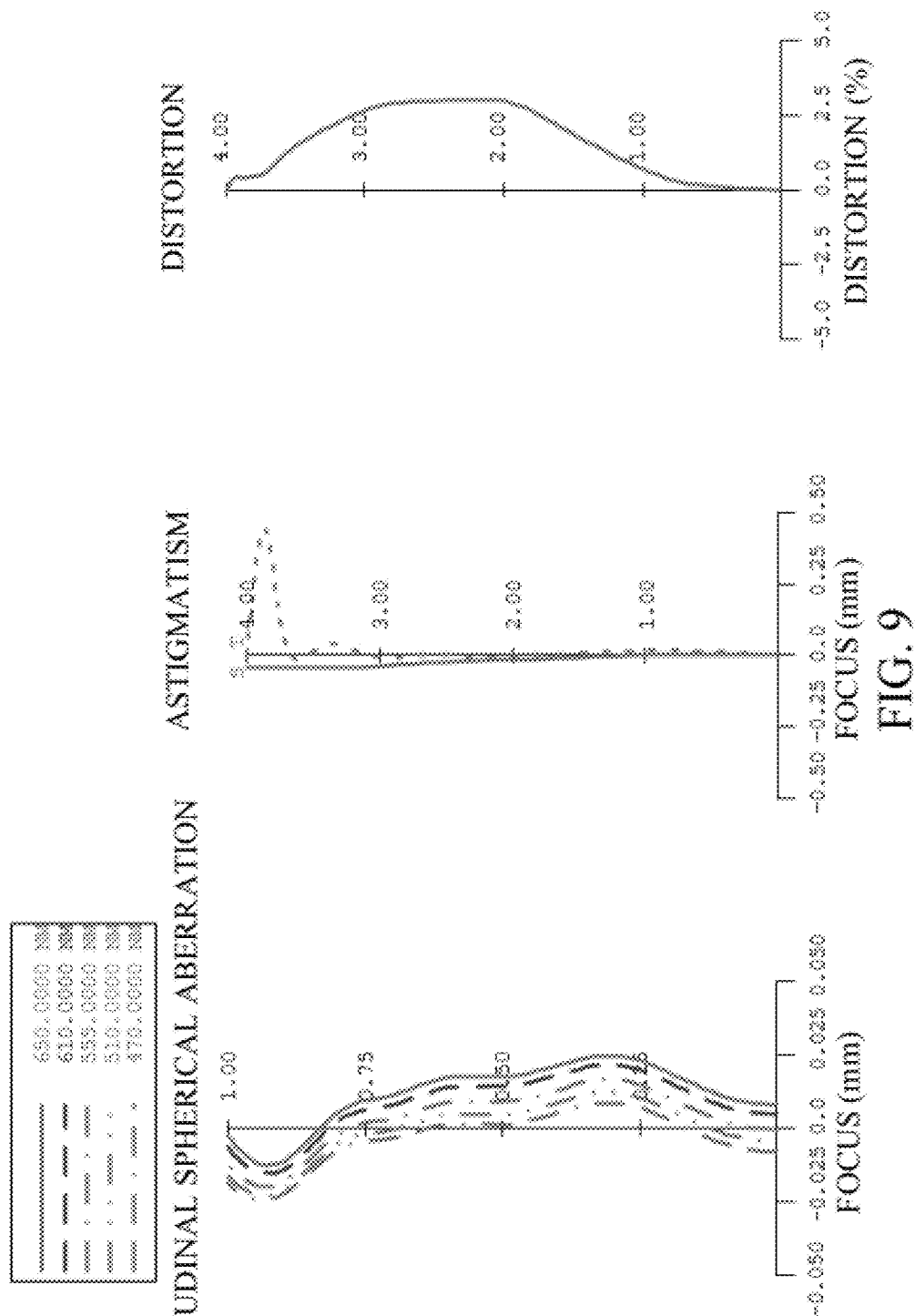
FIG. 9 illustrates a longitudinal spherical aberration curve, an astigmatic curve, and a distortion curve of the optical system of FIG. 8.

FIG. 9 shows a longitudinal spherical aberration curve, an astigmatic curve, and a distortion curve of the optical system according to the implementation of FIG. 8. The longitudinal spherical aberration curve represents deviation in focal point of rays with different wavelengths after the rays go through the lenses of the optical system. The astigmatic curve represents tangential image plane bending and sagittal image plane bending. The distortion curve represents distortion values corresponding to different angles of view. As can be seen in FIG. 9, the optical system in the implementation of FIG. 8 has high imaging quality.

Figure 10:
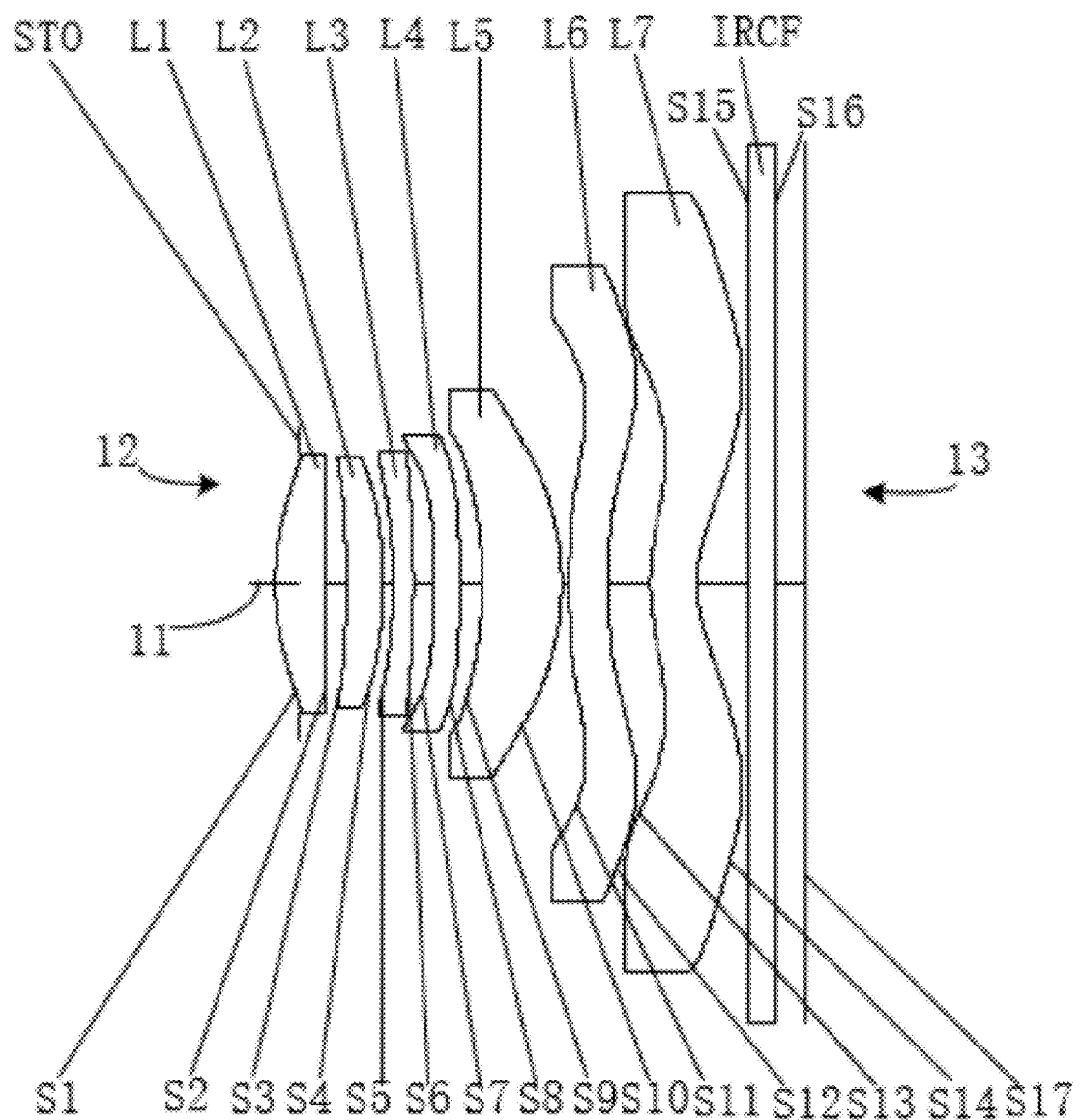
FIG. 10 is a schematic structural diagram of an optical system according to an implementation of this disclosure.

In FIG. 10, a straight line 11 represents an optical axis. A side of a first lens L1 away from a second lens L2 is an object side 12. A side of a seventh lens L7 away from a sixth lens L6 is an image side 13. An optical system of this implementation includes, from the object side 12 to the image side 13, a stop STO, the first lens L1, the second lens L2, a third lens L3, a fourth lens L4, a fifth lens L5, the sixth lens L6, the seventh lens L7, and an IRCF. At least one of an object-side surface or an image-side surface of the seventh lens L7 has an inflection point.

The first lens L1 with a positive refractive power is made of plastic. An object-side surface S1 is convex at the optical axis and at a periphery. An image-side surface S2 is concave at the optical axis and convex at the periphery. Both the object-side surface S1 and the image-side surface S2 of the first lens L1 are aspheric.

The second lens L2 with a positive refractive power is made of plastic. An object-side surface S3 is concave at the optical axis and at the periphery. An image-side surface S4 is convex at the optical axis and at the periphery. Both the object-side surface S3 and the image-side surface S4 of the second lens L2 are aspheric.

The third lens L3 with a negative refractive power is made of plastic. An object-side surface S5 is concave at the optical axis and at the periphery. An image-side surface S6 is convex at the optical axis and at the periphery. Both the object-side surface S5 and the image-side surface S6 of the third lens L3 are aspheric.

The fourth lens L4 with a negative refractive power is made of plastic. An object-side surface S7 is concave at the optical axis and at the periphery. An image-side surface S8 is convex at the optical axis and at the periphery. Both the object-side surface S7 and the image-side surface S8 of the fourth lens L4 are aspheric.

The fifth lens L5 with a positive refractive power is made of plastic. An object-side surface S9 is concave at the optical axis and at the periphery. An image-side surface S10 is convex at the optical axis and at the periphery. Both the object-side surface S9 and the image-side surface S10 of the fifth lens L5 are aspheric.

The sixth lens L6 with a positive refractive power is made of plastic. An object-side surface S11 is convex at the optical axis and concave at the periphery. An image-side surface S12 is concave at the optical axis and convex at the periphery. Both the object-side surface S11 and the image-side surface S12 of the sixth lens L6 are aspheric.

The seventh lens L7 with a negative refractive power is made of plastic. An object-side surface S13 is convex at the optical axis and concave at the periphery. An image-side surface S14 is concave at the optical axis and convex at the periphery. Both the object-side surface S13 and the image-side surface S14 of the seventh lens L7 are aspheric.

The stop STO may be located between the object side of the optical system and the seventh lens L7. In this implementation, the stop STO is disposed at one side of the first lens L1 away from the second lens L2 to control the amount of light passed.

The IRCF is disposed after the seventh lens L7. The IRCF includes an object-side surface S15 and an image-side surface S16. The IRCF is configured to filter out the infrared light so that the light incident onto the imaging surface is visible light. Visible light has a wavelength ranging from 380 nm to 780 nm. The IRCF is made of glass.

An imaging surface S17 is the surface where an image formed by the light of the photographed object after going through the optical system is located.

Table 5a illustrates the characteristics of the optical system in this implementation.

TABLE 5a

Implementation of FIG. 10
f = 4.1 mm, FNO = 1.75, FOV = 87.7°, TTL = 5.72 mm

| Surface number | Surface name | Surface type | Radius of curvature (mm) | Thickness (mm) | Material | Refractive index | Abbe number | Focal length (mm) |
|---|---|---|---|---|---|---|---|---|
| Object surface | Object surface | spheric | Infinity | 5.22E+02 | | | | |
| STO | Stop | spheric | Infinity | −0.261 | | | | |
| S1 | First lens | aspheric | 2.196 | 0.540 | plastic | 1.544 | 56.114 | 4.88 |
| S2 | | aspheric | 11.369 | 0.226 | | | | |
| S3 | Second | aspheric | −13.036 | 0.392 | plastic | 1.535 | 55.790 | 11.16 |
| S4 | lens | aspheric | −4.146 | 0.108 | | | | |
| S5 | Third | aspheric | −4.323 | 0.220 | plastic | 1.671 | 20.390 | −11.97 |
| S6 | lens | aspheric | −9.458 | 0.222 | | | | |
| S7 | Fourth | aspheric | −15.623 | 0.276 | plastic | 1.671 | 20.390 | −76.29 |
| S8 | lens | aspheric | −22.559 | 0.239 | | | | |
| S9 | Fifth lens | aspheric | −4.285 | 0.859 | plastic | 1.540 | 52.100 | 8.14 |
| S10 | | aspheric | −2.325 | 0.080 | | | | |
| S11 | Sixth lens | aspheric | 11.687 | 0.428 | plastic | 1.671 | 20.390 | 109.78 |
| S12 | | aspheric | 13.663 | 0.446 | | | | |
| S13 | Seventh | aspheric | 1.705 | 0.503 | plastic | 1.534 | 55.770 | −6.31 |
| S14 | lens | aspheric | 1.017 | 0.565 | | | | |
| S15 | Infrared | spheric | Infinity | 0.274 | glass | 1.517 | 64.167 | |
| S16 | cut-off filter | spheric | Infinity | 0.341 | | | | |
| S17 | Imaging surface | spheric | Infinity | 0.000 | | | | |

Note:
a reference wavelength is 555 nm

In Table 5a, f represents an effective focal length of the optical system, FNO represents an F-number of the optical system, FOV represents an angle of view of the optical system diagonally, and TTL represents a distance on the optical axis from the object-side surface of the first lens to the imaging surface of the optical system.

Table 5b shows high-order coefficients A4, A6, A8, A10, A12, A14, A16, A18, and A20 which are applicable to each of the aspheric lens surfaces S1, S2, S3, S4, S5, S6, S7, S8, S9, S10, S11, and S12 of the implementation of FIG. 10.

The second lens L2 with a positive refractive power is made of plastic. An object-side surface S3 is concave at the optical axis and at the periphery. An image-side surface S4 is convex at the optical axis and at the periphery. Both the object-side surface S3 and the image-side surface S4 of the second lens L2 are aspheric.

The third lens L3 with a negative refractive power is made of plastic. An object-side surface S5 is concave at the optical axis and at the periphery. An image-side surface S6 is TABLE 5b Implementation of FIG. 10
Aspheric coefficients

| Surface number | S1 | S2 | S3 | S4 | S5 | S6 | S7 |
|---|---|---|---|---|---|---|---|
| K   | −5.7536E−01 |  2.3527E+01 |  9.3456E+01 |  3.9551E+00 |  2.0977E−02 | −1.7962E−01 | −1.3208E+01 |
| A4  |  1.2735E−03 | −1.6394E−02 | −2.7636E−02 | −2.9238E−02 |  1.4193E−03 |  3.1488E−03 | −7.6860E−02 |
| A6  | −6.1942E−02 | −1.0665E−01 | −2.5605E−02 | −6.3603E−02 |  2.8680E−03 | −1.5044E−02 | −1.1646E−01 |
| A8  |  3.8637E−01 |  4.8506E−01 |  6.8624E−02 |  2.7993E−01 | −1.0982E−01 |  1.3316E−02 |  4.1138E−01 |
| A10 | −1.3421E+00 | −1.4001E+00 | −1.0770E−02 | −6.5094E−01 |  5.6058E−01 |  6.6305E−02 | −9.0654E−01 |
| A12 |  2.6258E+00 |  2.4527E+00 | −2.2399E−01 |  9.4891E−01 | −1.3601E+00 | −2.1780E−01 |  1.2437E+00 |
| A14 | −3.0620E+00 | −2.6765E+00 |  4.3669E−01 | −9.0660E−01 |  1.8476E+00 |  2.9500E−01 | −1.0904E+00 |
| A16 |  2.1000E+00 |  1.7773E+00 | −3.6703E−01 |  5.5513E−01 | −1.4410E+00 | −2.1269E−01 |  5.9026E−01 |
| A18 | −7.8332E−01 | −6.5796E−01 |  1.4665E−01 | −1.9956E−01 |  6.0367E−01 |  8.0307E−02 | −1.7832E−01 |
| A20 |  1.2272E−01 |  1.0470E−01 | −2.2045E−02 |  3.2142E−02 | −1.0535E−01 | −1.2542E−02 |  2.3139E−02 |

| Surface number | S8 | S9 | S10 | S11 | S12 | S13 | S14 |
|---|---|---|---|---|---|---|---|
| K   |  6.8563E+01 |  8.1154E+00 | −1.9931E+00 | −9.9000E+01 |  1.2250E+01 | −7.5863E+00 | −3.4453E+00 |
| A4  | −5.8233E−02 | −6.2803E−02 | −1.0761E−01 |  1.0230E−01 |  1.7291E−01 | −4.9925E−02 | −5.8464E−02 |
| A6  | −1.1983E−01 | −2.3202E−02 |  1.2668E−01 | −4.3354E−02 | −1.2557E−01 | −1.7377E−02 |  1.3277E−02 |
| A8  |  5.0995E−01 |  3.6698E−01 | −8.8563E−02 | −1.5427E−02 |  4.5138E−02 |  1.8278E−02 | −1.0311E−03 |
| A10 | −9.9890E−01 | −6.8079E−01 |  2.0254E−02 |  1.9492E−02 | −9.9666E−03 | −7.9970E−03 | −5.3916E−04 |
| A12 |  1.1746E+00 |  6.8487E−01 |  1.8813E−02 | −8.3500E−03 |  1.3268E−03 |  2.0540E−03 |  1.9183E−04 |
| A14 | −8.7919E−01 | −4.2879E−01 | −1.8551E−02 |  2.0301E−03 | −9.5130E−05 | −3.1333E−04 | −2.8178E−05 |
| A16 |  4.0883E−01 |  1.6538E−01 |  7.2283E−03 | −2.9675E−04 |  2.1926E−06 |  2.7853E−05 |  2.1911E−06 |
| A18 | −1.0727E−01 | −3.5634E−02 | −1.3810E−03 |  2.4416E−05 |  1.2119E−07 | −1.3354E−06 | −8.8535E−08 |
| A20 |  1.2128E−02 |  3.2409E−03 |  1.0615E−04 | −8.6961E−07 | −6.3428E−09 |  2.6735E−08 |  1.4654E−09 |

Figure 11:
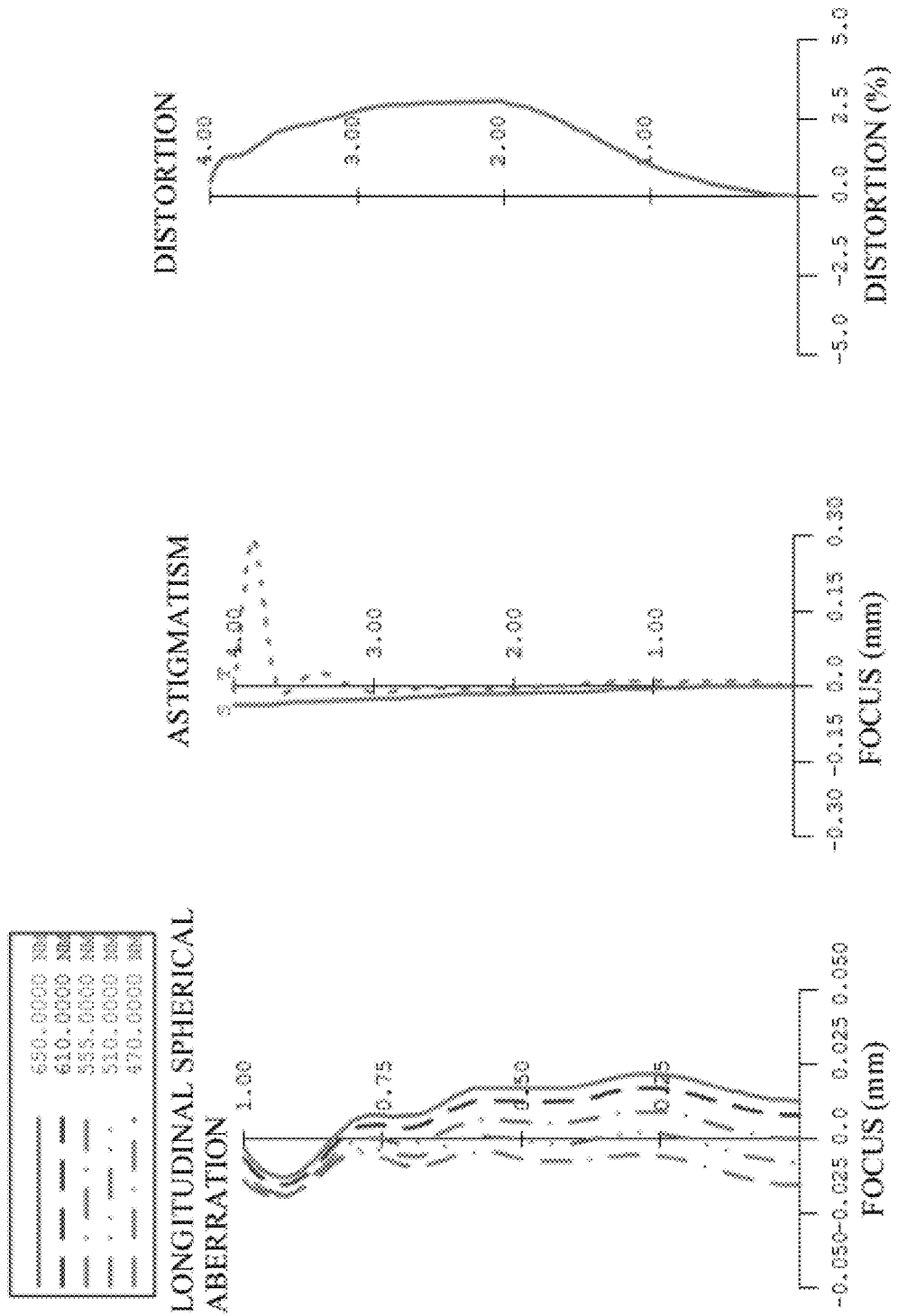
FIG. 11 illustrates a longitudinal spherical aberration curve, an astigmatic curve, and a distortion curve of the optical system of FIG. 10.

FIG. 11 shows a longitudinal spherical aberration curve, an astigmatic curve, and a distortion curve of the optical system according to the implementation of FIG. 10. The longitudinal spherical aberration curve represents deviation in focal point of rays with different wavelengths after the rays go through the lenses of the optical system. The astigmatic curve represents tangential image plane bending and sagittal image plane bending. The distortion curve represents distortion values corresponding to different angles of view. As can be seen in FIG. 11, the optical system in the implementation of FIG. 10 has high imaging quality.

Figure 12:
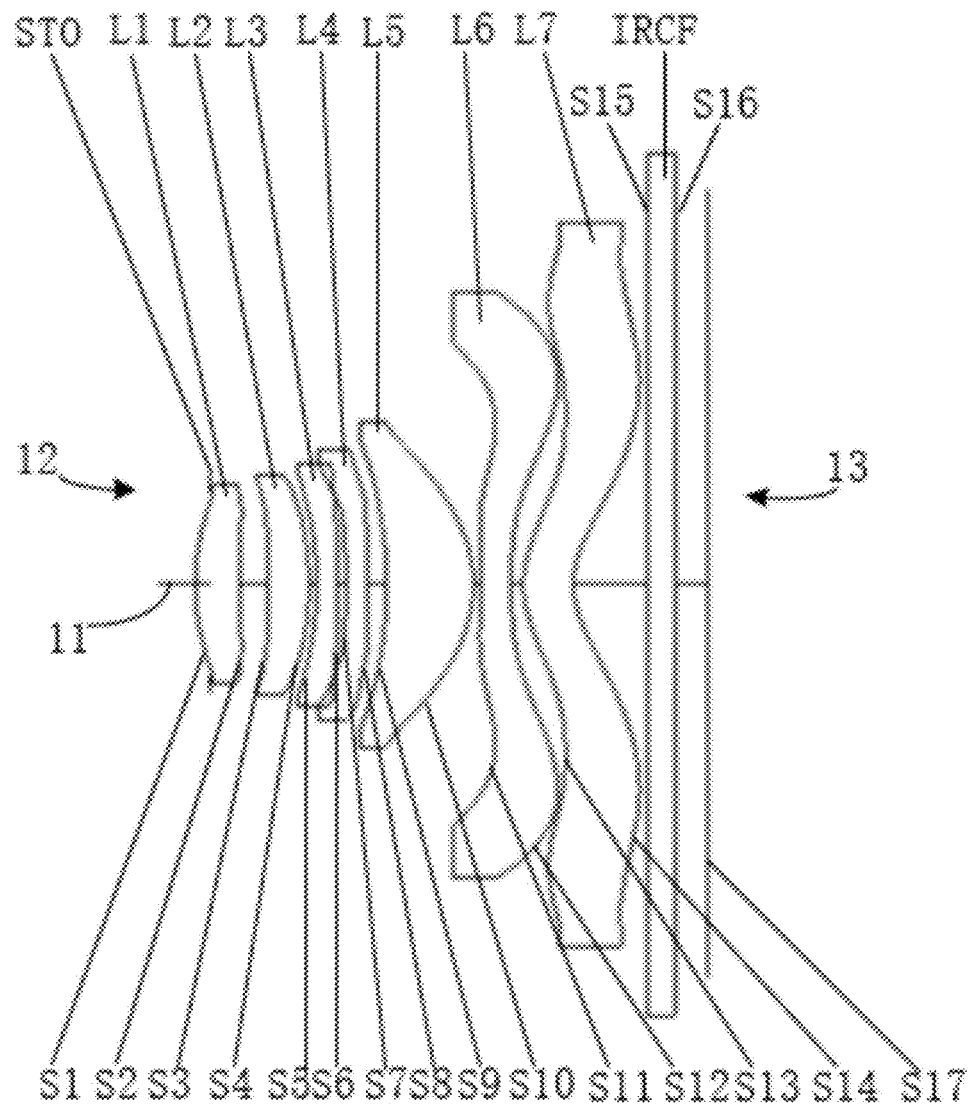
FIG. 12 is a schematic structural diagram of an optical system according to an implementation of this disclosure.

In FIG. 12, a straight line 11 represents an optical axis. A side of a first lens L1 away from a second lens L2 is an object side 12. A side of a seventh lens L7 away from a sixth lens L6 is an image side 13. An optical system of this implementation includes, from the object side 12 to the image side 13, a stop STO, the first lens L1, the second lens L2, a third lens L3, a fourth lens L4, a fifth lens L5, the sixth lens L6, the seventh lens L7, and an IRCF. At least one of an object-side surface or an image-side surface of the seventh lens L7 has an inflection point.

The first lens L1 with a positive refractive power is made of plastic. An object-side surface S1 is convex at the optical axis and at a periphery. An image-side surface S2 is concave at the optical axis and convex at the periphery. Both the object-side surface S1 and the image-side surface S2 of the first lens L1 are aspheric.

convex at the optical axis and at the periphery. Both the object-side surface S5 and the image-side surface S6 of the third lens L3 are aspheric.

The fourth lens L4 with a negative refractive power is made of plastic. An object-side surface S7 is concave at the optical axis and at the periphery. An image-side surface S8 is concave at the optical axis and convex at the periphery. Both the object-side surface S7 and the image-side surface S8 of the fourth lens L4 are aspheric.

The fifth lens L5 with a positive refractive power is made of plastic. An object-side surface S9 is concave at the optical axis and at the periphery. An image-side surface S10 is convex at the optical axis and at the periphery. Both the object-side surface S9 and the image-side surface S10 of the fifth lens L5 are aspheric.

The sixth lens L6 with a negative refractive power is made of plastic. An object-side surface S11 is concave at the optical axis and at the periphery. An image-side surface S12 is concave at the optical axis and convex at the periphery. Both the object-side surface S11 and the image-side surface S12 of the sixth lens L6 are aspheric.

The seventh lens L7 with a positive refractive power is made of plastic. An object-side surface S13 is convex at the optical axis and at the periphery. An image-side surface S14 is concave at the optical axis and convex at the periphery. Both the object-side surface S13 and the image-side surface S14 of the seventh lens L7 are aspheric.

The stop STO may be located between the object side of the optical system and the seventh lens L7. In this implementation, the stop STO is disposed at one side of the first lens L1 away from the second lens L2 to control the amount of light passed.

The IRCF is disposed after the seventh lens L7. The IRCF includes an object-side surface S15 and an image-side surface S16. The IRCF is configured to filter out the infrared light so that the light incident onto the imaging surface is visible light. Visible light has a wavelength ranging from 380 nm to 780 nm. The IRCF is made of glass.

An imaging surface S17 is the surface where an image formed by the light of the photographed object after going through the optical system is located.

Table 6a illustrates the characteristics of the optical system in this implementation.

TABLE 6a

Implementation of FIG. 12
f = 3.338 mm, FNO = 1.8, FOV = 100°, TTL = 5.23 mm

| Surface number | Surface name | Surface type | Radius of curvature (mm) | Thickness (mm) | Material | Refractive index | Abbe number | Focal length (mm) |
|---|---|---|---|---|---|---|---|---|
| Object surface | Object surface | spheric | Infinity | 5.54E+02 | | | | |
| STO | Stop | spheric | Infinity | −0.167 | | | | |
| S1 | First lens | aspheric | 2.239 | 0.451 | plastic | 1.544 | 56.114 | 5.26 |
| S2 | | aspheric | 9.451 | 0.233 | | | | |
| S3 | Second lens | aspheric | −13.378 | 0.387 | plastic | 1.535 | 55.790 | 8.00 |
| S4 | | aspheric | −3.285 | 0.080 | | | | |
| S5 | Third lens | aspheric | −3.402 | 0.220 | plastic | 1.671 | 20.390 | −7.95 |
| S6 | | aspheric | −9.487 | 0.185 | | | | |
| S7 | Fourth lens | aspheric | −30.807 | 0.220 | plastic | 1.671 | 20.390 | −33.29 |
| S8 | | aspheric | 84.233 | 0.193 | | | | |
| S9 | Fifth lens | aspheric | −5.666 | 0.902 | plastic | 1.535 | 55.750 | 3.17 |
| S10 | | aspheric | −1.381 | 0.080 | | | | |
| S11 | Sixth lens | aspheric | −3.756 | 0.285 | plastic | 1.544 | 56.114 | −5.01 |
| S12 | | aspheric | 10.309 | 0.100 | | | | |
| S13 | Seventh lens | aspheric | 0.951 | 0.506 | plastic | 1.559 | 41.180 | 29.88 |
| S14 | | aspheric | 0.816 | 0.767 | | | | |
| S15 | Infrared cut-off filter | spheric | Infinity | 0.291 | glass | 1.517 | 64.167 | |
| S16 | | spheric | Infinity | 0.329 | | | | |
| S17 | Imaging surface | spheric | Infinity | 0.000 | | | | |

Note:
a reference wavelength is 555 nm

In Table 6a, f represents an effective focal length of the optical system, FNO represents an F-number of the optical system, FOV represents an angle of view of the optical system diagonally, and TTL represents a distance on the optical axis from the object-side surface of the first lens to the imaging surface of the optical system.

Table 6b shows high-order coefficients A4, A6, A8, A10, A12, A14, A16, A18, and A20 which are applicable to each of the aspheric lens surfaces S1, S2, S3, S4, S5, S6, S7, S8, S9, S10, S11, and S12 of the implementation of FIG. 12.

TABLE 6b

Implementation of FIG. 12
Aspheric coefficients

| Surface number | S1 | S2 | S3 | S4 | S5 | S6 | S7 |
|---|---|---|---|---|---|---|---|
| K | −1.2075E+00 | −9.9000E+01 | 9.9000E+01 | 2.5966E+00 | 7.7200E−01 | 1.2674E+01 | −8.6772E+01 |
| A4 | 6.5245E−04 | 7.8082E−03 | −2.0254E−02 | −9.9469E−03 | 6.0212E−14 | −5.6509E−03 | −3.4034E−02 |
| A6 | −5.6644E−02 | −2.3788E−01 | −1.4293E−01 | −1.1505E−01 | −1.2146E−12 | 3.8013E−02 | −2.0853E−01 |
| A8 | 9.9965E−01 | 1.1301E+00 | 6.7509E−01 | 4.5081E−01 | 8.7387E−12 | −6.9900E−02 | 6.3400E−01 |
| A10 | −6.3784E+00 | −3.6566E+00 | −2.4841E+00 | −9.9110E−01 | −3.1717E−11 | −6.6236E−02 | −1.6158E+00 |

TABLE 6b-continued

Implementation of FIG. 12
Aspheric coefficients

| A12 | 2.0851E+01 | 7.3202E+00 | 6.1612E+00 | 1.4341E+00 | 6.5724E−11 | 3.7616E−01 | 2.5426E+00 |
|---|---|---|---|---|---|---|---|
| A14 | −3.9345E+01 | −9.5754E+00 | −9.8880E+00 | −1.4132E+00 | −8.1244E−11 | −5.3381E−01 | −2.4186E+00 |
| A16 | 4.3184E+01 | 8.0970E+00 | 9.7497E+00 | 9.6654E−01 | 5.9297E−11 | 3.7392E−01 | 1.4044E+00 |
| A18 | −2.5646E+01 | −4.0801E+00 | −5.3522E+00 | −4.3105E−01 | −2.3589E−11 | −1.3422E−01 | −4.6870E−01 |
| A20 | 6.3727E+00 | 9.3218E−01 | 1.2483E+00 | 9.0795E−02 | 3.9442E−12 | 1.9940E−02 | 6.9308E−02 |

| Surface number | S8 | S9 | S10 | S11 | S12 | S13 | S14 |
|---|---|---|---|---|---|---|---|
| K | 9.9000E+01 | 7.9116E+00 | −2.3106E+00 | −8.8521E+01 | 5.6345E+00 | −4.5587E+00 | −2.7809E+00 |
| A4 | −1.3048E−02 | −3.2175E−02 | −1.3171E−01 | 1.4715E−01 | 1.6380E−01 | 4.0702E−02 | −2.6248E−02 |
| A6 | −1.0110E−01 | −5.7919E−02 | 2.3628E−01 | −3.7425E−02 | −1.0497E−01 | −8.9570E−02 | −1.8399E−02 |
| A8 | 2.2176E−01 | 3.0356E−01 | −3.2033E−01 | −3.1562E−02 | 4.0088E−02 | 4.7631E−02 | 1.3290E−02 |
| A10 | −3.9399E−01 | −4.2704E−01 | 3.0016E−01 | 2.9739E−02 | −1.1823E−02 | −1.3416E−02 | −4.1130E−03 |
| A12 | 4.1925E−01 | 2.9147E−01 | −1.9357E−01 | −1.2784E−02 | 2.6708E−03 | 2.2505E−03 | 7.2064E−04 |
| A14 | −2.5179E−01 | −9.8290E−02 | 8.4832E−02 | 3.2625E−03 | −4.2807E−04 | −2.3120E−04 | −7.5443E−05 |
| A16 | 8.4174E−02 | 9.7637E−03 | −2.4640E−02 | −4.9470E−04 | 4.4151E−05 | 1.4268E−05 | 4.6711E−06 |
| A18 | −1.4633E−02 | 2.9134E−03 | 4.3556E−03 | 4.0850E−05 | −2.5762E−06 | −4.8575E−07 | −1.5772E−07 |
| A20 | 1.0543E−03 | −6.5410E−04 | −3.5197E−04 | −1.4089E−06 | 6.4059E−08 | 7.0107E−09 | 2.2364E−09 |

Figure 13:
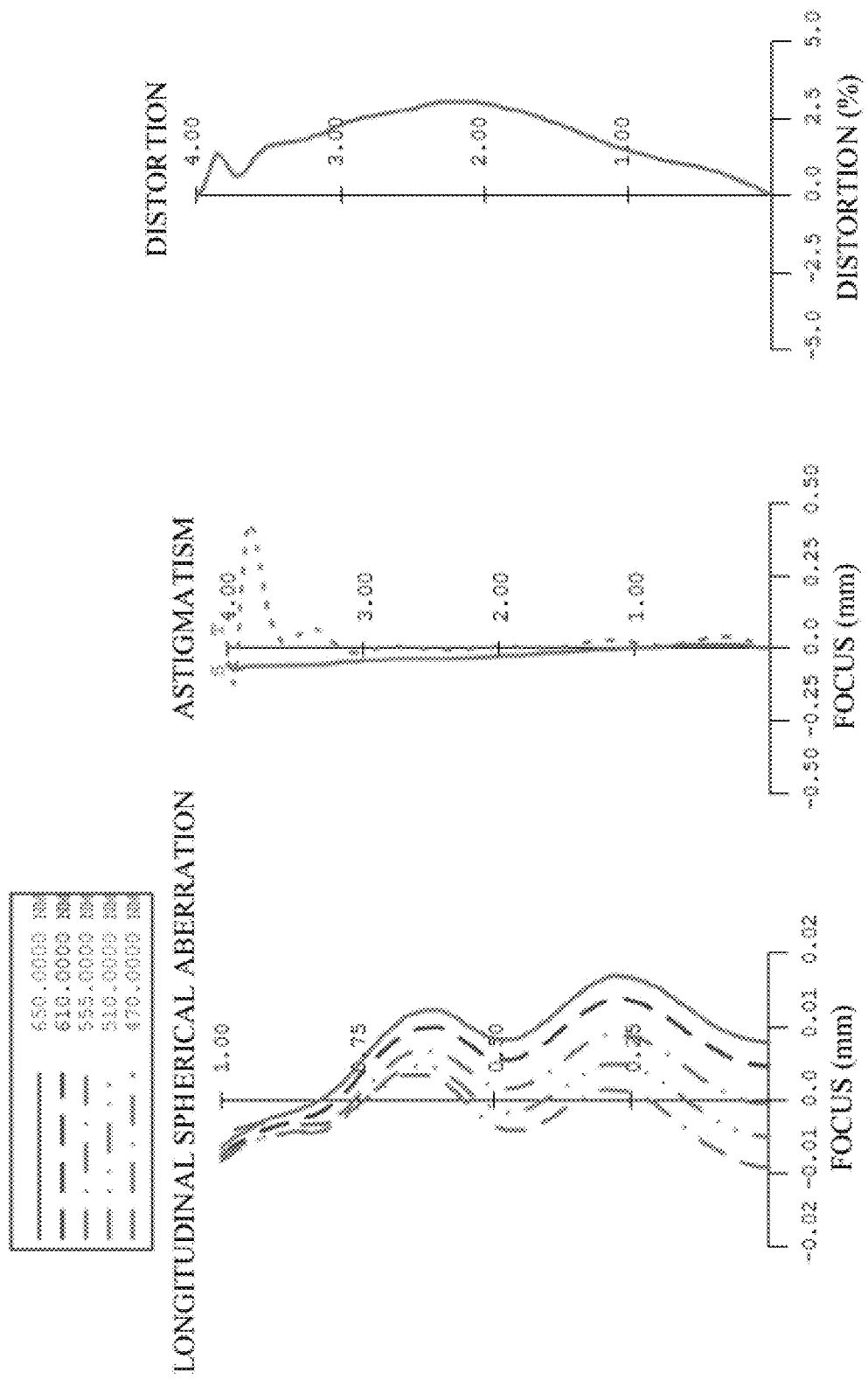
FIG. 13 illustrates a longitudinal spherical aberration curve, an astigmatic curve, and a distortion curve of the optical system of FIG. 12.

FIG. 13 shows a longitudinal spherical aberration curve, an astigmatic curve, and a distortion curve of the optical system according to the implementation of FIG. 12. The longitudinal spherical aberration curve represents deviation in focal point of rays with different wavelengths after the rays go through the lenses of the optical system. The astigmatic curve represents tangential image plane bending and sagittal image plane bending. The distortion curve represents distortion values corresponding to different angles of view. As can be seen in FIG. 13, the optical system in the implementation of FIG. 12 has high imaging quality.

Figure 14:
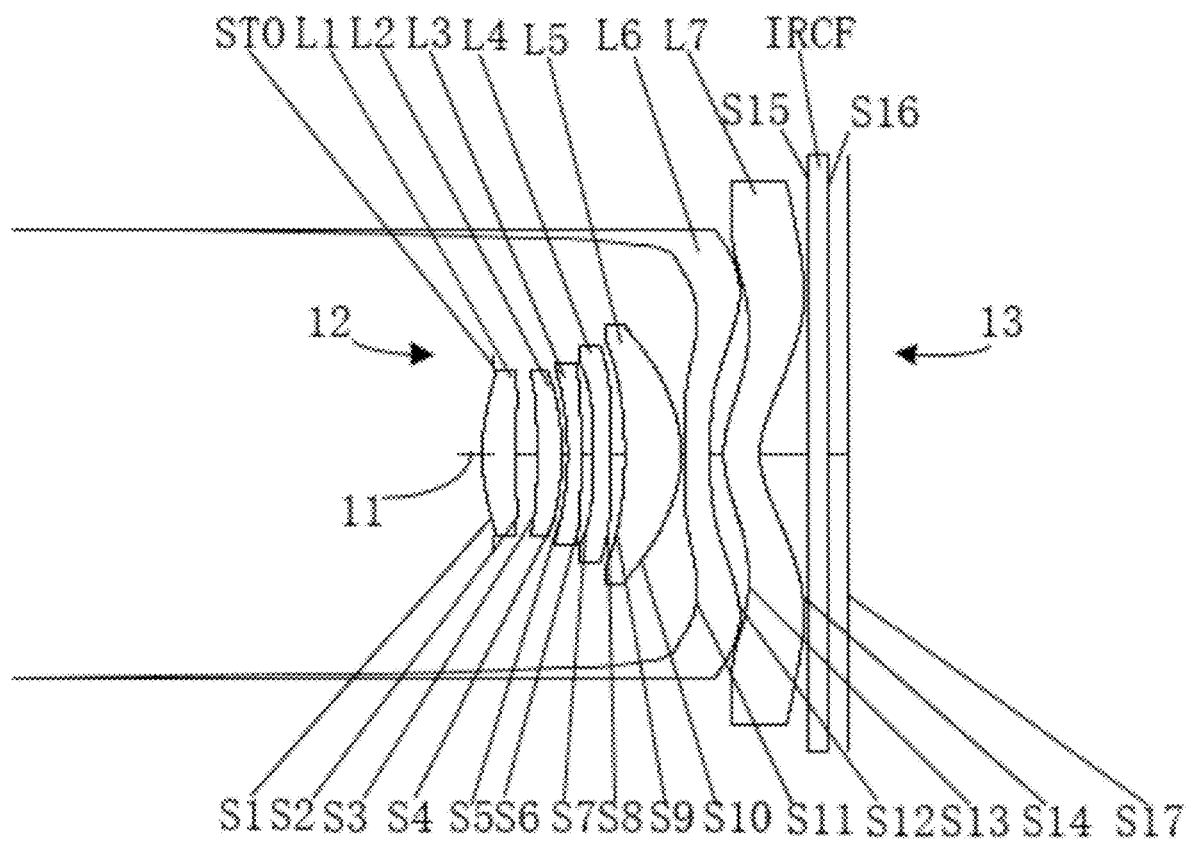
FIG. 14 is a schematic structural diagram of an optical system according to an implementation of this disclosure.

In FIG. 14, a straight line 11 represents an optical axis. A side of a first lens L1 away from a second lens L2 is an object side 12. A side of a seventh lens L7 away from a sixth lens L6 is an image side 13. An optical system of this implementation includes, from the object side 12 to the image side 13, a stop STO, the first lens L1, the second lens L2, a third lens L3, a fourth lens L4, a fifth lens L5, the sixth lens L6, the seventh lens L7, and an IRCF. At least one of an object-side surface or an image-side surface of the seventh lens L7 has an inflection point.

The first lens L1 with a positive refractive power is made of plastic. An object-side surface S1 is convex at the optical axis and at a periphery. An image-side surface S2 is concave at the optical axis and convex at the periphery. Both the object-side surface S1 and the image-side surface S2 of the first lens L1 are aspheric.

The second lens L2 with a positive refractive power is made of plastic. An object-side surface S3 is concave at the optical axis and at the periphery. An image-side surface S4 is convex at the optical axis and at the periphery. Both the object-side surface S3 and the image-side surface S4 of the second lens L2 are aspheric.

The third lens L3 with a negative refractive power is made of plastic. An object-side surface S5 is concave at the optical axis and at the periphery. An image-side surface S6 is convex at the optical axis and at the periphery. Both the object-side surface S5 and the image-side surface S6 of the third lens L3 are aspheric.

The fourth lens L4 with a negative refractive power is made of plastic. An object-side surface S7 is concave at the optical axis and at the periphery. An image-side surface S8 is convex at the optical axis and at the periphery. Both the object-side surface S7 and the image-side surface S8 of the fourth lens L4 are aspheric.

The fifth lens L5 with a positive refractive power is made of plastic. An object-side surface S9 is concave at the optical axis and at the periphery. An image-side surface S10 is convex at the optical axis and at the periphery. Both the object-side surface S9 and the image-side surface S10 of the fifth lens L5 are aspheric.

The sixth lens L6 with a negative refractive power is made of plastic. An object-side surface S11 is concave at the optical axis and at the periphery. An image-side surface S12 is concave at the optical axis and convex at the periphery. Both the object-side surface S11 and the image-side surface S12 of the sixth lens L6 are aspheric.

The seventh lens L7 with a positive refractive power is made of plastic. An object-side surface S13 is convex at the optical axis and concave at the periphery. An image-side surface S14 is concave at the optical axis and convex at the periphery. Both the object-side surface S13 and the image-side surface S14 of the seventh lens L7 are aspheric.

The stop STO may be located between the object side of the optical system and the seventh lens L7. In this implementation, the stop STO is disposed at one side of the first lens L1 away from the second lens L2 to control the amount of light passed.

The IRCF is disposed after the seventh lens L7. The IRCF includes an object-side surface S15 and an image-side surface S16. The IRCF is configured to filter out the infrared light so that the light incident onto the imaging surface is visible light. Visible light has a wavelength ranging from 380 nm to 780 nm. The IRCF is made of glass.

An imaging surface S17 is the surface where an image formed by the light of the photographed object after going through the optical system is located.

Table 7a illustrates the characteristics of the optical system in this implementation.

TABLE 7a

Implementation of FIG. 14
f = 3.835 mm, FNO = 1.75, FOV = 92°, TTL = 5.81 mm

| Surface number | Surface name | Surface type | Radius of curvature (mm) | Thickness (mm) | Material | Refractive index | Abbe number | Focal length (mm) |
|---|---|---|---|---|---|---|---|---|
| Object surface | Object surface | spheric | Infinity | 5.94E+02 | | | | |
| STO | Stop | spheric | Infinity | −0.190 | | | | |
| S1 | First lens | aspheric | 2.453 | 0.531 | plastic | 1.544 | 56.114 | 5.47 |
| S2 | | aspheric | 12.688 | 0.333 | | | | |
| S3 | Second lens | aspheric | −13.198 | 0.396 | plastic | 1.538 | 53.200 | 8.56 |
| S4 | | aspheric | −3.459 | 0.086 | | | | |
| S5 | Third lens | aspheric | −3.622 | 0.220 | plastic | 1.658 | 21.310 | −8.44 |
| S6 | | aspheric | −10.514 | 0.184 | | | | |
| S7 | Fourth lens | aspheric | −23.930 | 0.287 | plastic | 1.671 | 20.390 | −42.94 |
| S8 | | aspheric | −136.004 | 0.219 | | | | |
| S9 | Fifth lens | aspheric | −5.341 | 0.891 | plastic | 1.536 | 54.610 | 3.79 |
| S10 | | aspheric | −1.561 | 0.081 | | | | |
| S11 | Sixth lens | aspheric | −5.194 | 0.375 | plastic | 1.545 | 48.350 | −5.68 |
| S12 | | aspheric | 7.934 | 0.217 | | | | |
| S13 | Seventh lens | aspheric | 1.098 | 0.587 | plastic | 1.534 | 55.770 | 100.00 |
| S14 | | aspheric | 0.911 | 0.778 | | | | |
| S15 | Infrared cut-off filter | spheric | Infinity | 0.312 | glass | 1.517 | 64.167 | |
| S16 | | spheric | Infinity | 0.311 | | | | |
| S17 | Imaging surface | spheric | Infinity | 0.000 | | | | |

Note:
a reference wavelength is 555 nm

In Table 7a, f represents an effective focal length of the optical system, FNO represents an F-number of the optical system, FOV represents an angle of view of the optical system diagonally, and TTL represents a distance on the optical axis from the object-side surface of the first lens to the imaging surface of the optical system.

Table 7b shows high-order coefficients A4, A6, A8, A10, A12, A14, A16, A18, and A20 which are applicable to each of the aspheric lens surfaces S1, S2, S3, S4, S5, S6, S7, S8, S9, S10, S11, and S12 of the implementation of FIG. 14.

TABLE 7b

Implementation of FIG. 14
Aspheric coefficients

| Surface number | S1 | S2 | S3 | S4 | S5 | S6 | S7 |
|---|---|---|---|---|---|---|---|
| K | −1.1586E+00 | −9.8195E+01 | 9.8946E+01 | 3.3599E+00 | 0.0000E+00 | 0.0000E+00 | 9.9000E+01 |
| A4 | 2.9552E−03 | −1.5657E−02 | −1.2122E−02 | −6.3762E−03 | 0.0000E+00 | 0.0000E+00 | −6.9728E−02 |
| A6 | −2.6786E−02 | 1.5487E−02 | −6.4701E−02 | −1.1233E−01 | 0.0000E+00 | 0.0000E+00 | 1.3441E−01 |
| A8 | 1.4371E−01 | −2.2980E−01 | 6.7600E−02 | 4.6501E−01 | 0.0000E+00 | 0.0000E+00 | −6.7174E−01 |
| A10 | −5.1655E−01 | 8.2127E−01 | 2.2143E−01 | −1.3094E+00 | 0.0000E+00 | 0.0000E+00 | 1.4574E+00 |
| A12 | 1.0084E+00 | −1.6668E+00 | −1.0056E+00 | 2.4295E+00 | 0.0000E+00 | 0.0000E+00 | −1.9039E+00 |
| A14 | −1.1642E+00 | 1.9729E+00 | 1.7810E+00 | −2.8485E+00 | 0.0000E+00 | 0.0000E+00 | 1.5942E+00 |
| A16 | 7.8100E−01 | −1.3573E+00 | −1.6780E+00 | 2.0226E+00 | 0.0000E+00 | 0.0000E+00 | −8.3500E−01 |
| A18 | −2.8099E−01 | 5.0338E−01 | 8.2955E−01 | −7.9294E−01 | 0.0000E+00 | 0.0000E+00 | 2.4806E−01 |
| A20 | 4.1594E−02 | −7.7973E−02 | −1.7005E−01 | 1.3123E−01 | 0.0000E+00 | 0.0000E+00 | −3.1852E−02 |

| Surface number | S8 | S9 | S10 | S11 | S12 | S13 | S14 |
|---|---|---|---|---|---|---|---|
| K | 9.9000E+01 | 8.5899E+00 | −2.3774E+00 | −9.9000E+01 | −7.6169E+00 | −4.5344E+00 | −2.9698E+00 |
| A4 | −3.1159E−02 | −5.0270E−02 | −8.1489E−02 | 1.3055E−01 | 8.1602E−02 | −1.1040E−03 | −1.8515E−02 |
| A6 | 7.2667E−02 | 5.1594E−02 | 1.4067E−01 | −4.3666E−02 | −2.4537E−02 | −3.9172E−02 | −1.5203E−02 |
| A8 | −2.7580E−01 | 2.8820E−02 | −1.8514E−01 | −6.0973E−03 | −1.0661E−02 | 2.0503E−02 | 1.0317E−02 |
| A10 | 4.2098E−01 | −1.1734E−01 | 1.6386E−01 | 1.0141E−02 | 2.0373E−03 | −5.4806E−03 | −3.1713E−03 |
| A12 | −3.7679E−01 | 1.2428E−01 | −9.9935E−02 | −4.4828E−03 | −5.4099E−04 | 8.6542E−04 | 5.5602E−04 |
| A14 | 2.1643E−01 | −7.0327E−02 | 4.0715E−02 | 1.1222E−03 | 7.4541E−05 | −8.2231E−05 | −5.8187E−05 |
| A16 | −7.8231E−02 | 2.3478E−02 | −1.0515E−02 | −1.6544E−04 | −5.9209E−06 | 4.5531E−06 | 3.5933E−06 |
| A18 | 1.6019E−02 | −4.4749E−03 | 1.5605E−03 | 1.3261E−05 | 2.6017E−07 | −1.3201E−07 | −1.2079E−07 |
| A20 | −1.3979E−03 | 3.8444E−04 | −1.0122E−04 | −4.4399E−07 | −4.9791E−09 | 1.4635E−09 | 1.7027E−09 |

Figure 15:
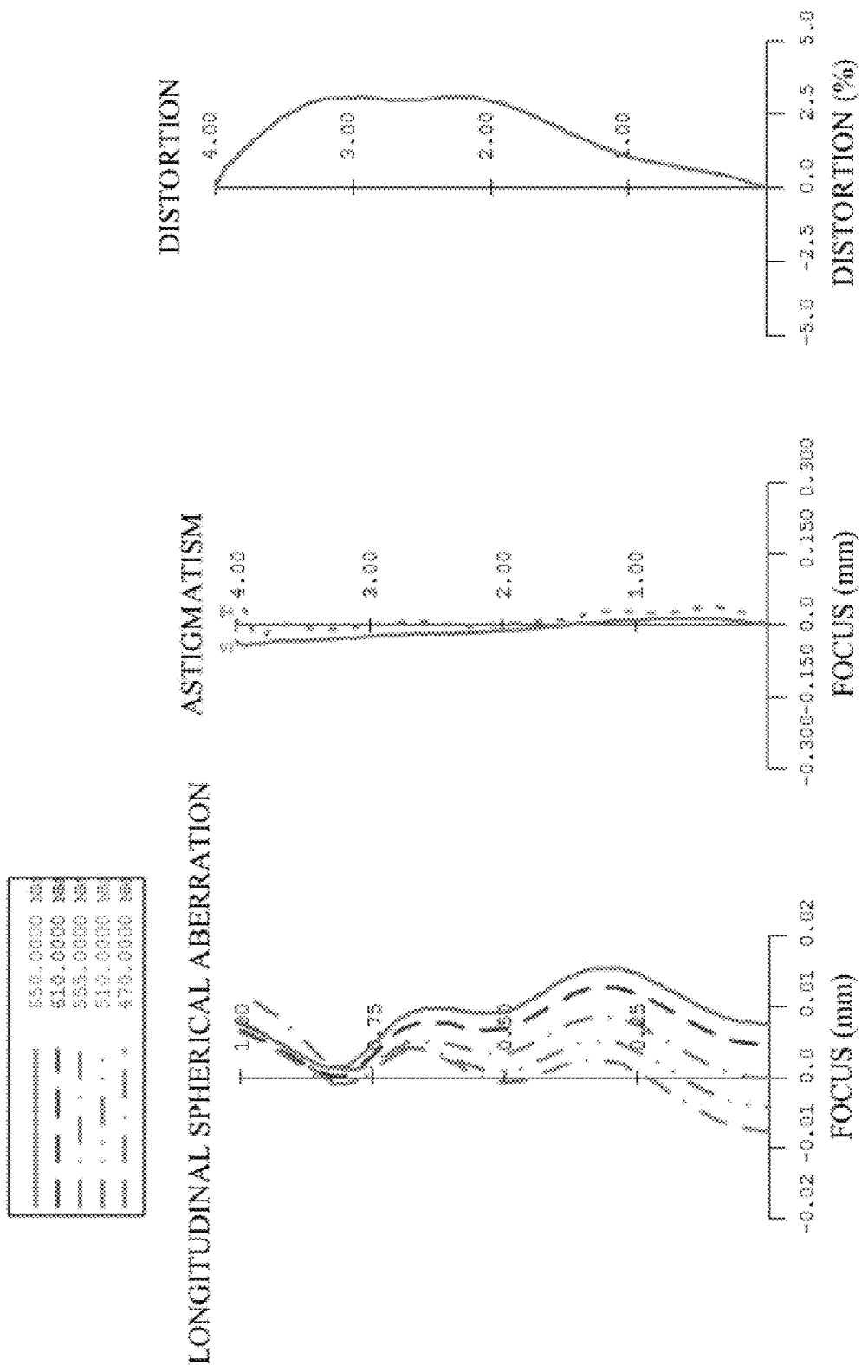
FIG. 15 illustrates a longitudinal spherical aberration curve, an astigmatic curve, and a distortion curve of the optical system of FIG. 14.

FIG. 15 shows a longitudinal spherical aberration curve, an astigmatic curve, and a distortion curve of the optical system according to the implementation of FIG. 14. The longitudinal spherical aberration curve represents deviation in focal point of rays with different wavelengths after the rays go through the lenses of the optical system. The astigmatic curve represents tangential image plane bending and sagittal image plane bending. The distortion curve represents distortion values corresponding to different angles of view. As can be seen in FIG. 15, the optical system in the implementation of FIG. 14 has high imaging quality.

Figure 16:
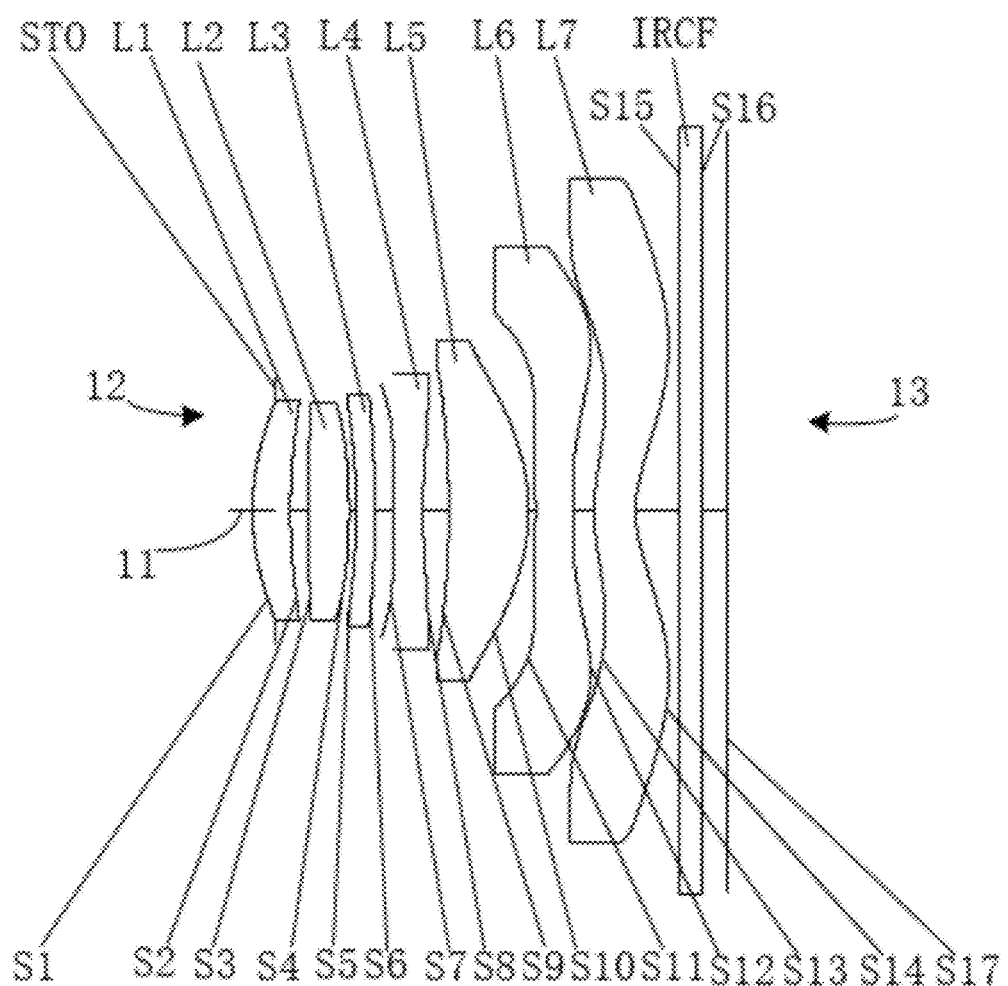
FIG. 16 is a schematic structural diagram of an optical system according to an implementation of this disclosure.

In FIG. 16, a straight line 11 represents an optical axis. A side of a first lens L1 away from a second lens L2 is an object side 12. A side of a seventh lens L7 away from a sixth lens L6 is an image side 13. An optical system of this implementation includes, from the object side 12 to the image side 13, a stop STO, the first lens L1, the second lens L2, a third lens L3, a fourth lens L4, a fifth lens L5, the sixth lens L6, the seventh lens L7, and an IRCF. At least one of an object-side surface or an image-side surface of the seventh lens L7 has an inflection point.

The first lens L1 with a positive refractive power is made of plastic. An object-side surface S1 is convex at the optical axis and at a periphery. An image-side surface S2 is concave at the optical axis and at the periphery. Both the object-side surface S1 and the image-side surface S2 of the first lens L1 are aspheric.

The second lens L2 with a positive refractive power is made of plastic. An object-side surface S3 is convex at the optical axis and at the periphery. An image-side surface S4 is convex at the optical axis and at the periphery. Both the object-side surface S3 and the image-side surface S4 of the second lens L2 are aspheric.

The third lens L3 with a negative refractive power is made of plastic. An object-side surface S5 is concave at the optical axis and at the periphery. An image-side surface S6 is convex at the optical axis and at the periphery. Both the object-side surface S5 and the image-side surface S6 of the third lens L3 are aspheric.

The fourth lens L4 with a negative refractive power is made of plastic. An object-side surface S7 is convex at the optical axis and concave at the periphery. An image-side surface S8 is concave at the optical axis and at the periphery. Both the object-side surface S7 and the image-side surface S8 of the fourth lens L4 are aspheric.

The fifth lens L5 with a positive refractive power is made of plastic. An object-side surface S9 is concave at the optical axis and at the periphery. An image-side surface S10 is convex at the optical axis and at the periphery. Both the object-side surface S9 and the image-side surface S10 of the fifth lens L5 are aspheric.

The sixth lens L6 with a negative refractive power is made of plastic. An object-side surface S11 is concave at the optical axis and at the periphery. An image-side surface S12 is concave at the optical axis and convex at the periphery. Both the object-side surface S11 and the image-side surface S12 of the sixth lens L6 are aspheric.

The seventh lens L7 with a negative refractive power is made of plastic. An object-side surface S13 is convex at the optical axis and concave at the periphery. An image-side surface S14 is concave at the optical axis and convex at the periphery. Both the object-side surface S13 and the image-side surface S14 of the seventh lens L7 are aspheric.

The stop STO may be located between the object side of the optical system and the seventh lens L7. In this implementation, the stop STO is disposed at one side of the first lens L1 away from the second lens L2 to control the amount of light passed.

The IRCF is disposed after the seventh lens L7. The IRCF includes an object-side surface S15 and an image-side surface S16. The IRCF is configured to filter out infrared light so that the light incident onto the imaging surface is visible light. Visible light has a wavelength ranging from 380 nm to 780 nm. The IRCF is made of glass.

An imaging surface S17 is the surface where an image formed by the light of the photographed object after going through the optical system is located.

Table 8a illustrates the characteristics of the optical system in this implementation.

TABLE 8a

Implementation of FIG. 16
f = 4.25 mm, FNO = 1.85, FOV = 85°, TTL = 5.91 mm

| Surface number | Surface name | Surface type | Radius of curvature (mm) | Thickness (mm) | Material | Refractive index | Abbe number | Focal length (mm) |
|---|---|---|---|---|---|---|---|---|
| Object surface | Object surface | spheric | Infinity | 5.66E+02 | | | | |
| STO | Stop | spheric | Infinity | −0.279 | | | | |
| S1 | First | aspheric | 2.264 | 0.473 | plastic | 1.544 | 56.114 | 6.79 |
| S2 | lens | aspheric | 5.387 | 0.214 | | | | |
| S3 | Second | aspheric | 10.867 | 0.516 | plastic | 1.535 | 55.790 | 7.49 |
| S4 | lens | aspheric | −6.274 | 0.090 | | | | |
| S5 | Third | aspheric | −6.128 | 0.232 | plastic | 1.671 | 20.390 | −23.48 |
| S6 | lens | aspheric | −10.126 | 0.219 | | | | |
| S7 | Fourth | aspheric | 12.781 | 0.379 | plastic | 1.671 | 20.390 | −12.33 |
| S8 | lens | aspheric | 4.989 | 0.323 | | | | |
| S9 | Fifth | aspheric | −15.881 | 1.000 | plastic | 1.585 | 30.620 | 3.23 |
| S10 | lens | aspheric | −1.738 | 0.083 | | | | |
| S11 | Sixth | aspheric | −5.539 | 0.465 | plastic | 1.667 | 20.740 | −6.22 |
| S12 | lens | aspheric | 17.701 | 0.268 | | | | |
| S13 | Seventh | aspheric | 1.807 | 0.517 | plastic | 1.534 | 55.770 | −5.97 |
| S14 | lens | aspheric | 1.040 | 0.534 | | | | |
| S15 | Infrared | spheric | Infinity | 0.297 | glass | 1.517 | 64.167 | |
| S16 | cut-off filter | spheric | Infinity | 0.298 | | | | |
| S17 | Imaging surface | spheric | Infinity | 0.000 | | | | |

Note:
a reference wavelength is 555 nm

In Table 8a, f represents an effective focal length of the optical system, FNO represents an F-number of the optical system, FOV represents an angle of view of the optical system diagonally, and TTL represents a distance on the optical axis from the object-side surface of the first lens to the imaging surface of the optical system.

Table 8b shows high-order coefficients A4, A6, A8, A10, A12, A14, A16, A18, and A20 which are applicable to each of the aspheric lens surfaces S1, S2, S3, S4, S5, S6, S7, S8, S9, S10, S11, and S12 of the implementation of FIG. 16.

TABLE 8b

Implementation of FIG. 16
Aspheric coefficients

| Surface number | S1 | S2 | S3 | S4 | S5 | S6 | S7 |
|---|---|---|---|---|---|---|---|
| K | −4.6362E−01 | 1.7837E+01 | 7.0675E+01 | 7.1502E+00 | −6.3777E−02 | 2.6040E−01 | 8.9113E+01 |
| A4 | −3.7612E−03 | −1.2876E−02 | −2.7960E−02 | −2.1138E−02 | 1.1210E−03 | −2.3648E−03 | −7.7492E−02 |
| A6 | −2.4704E−02 | −1.0205E−01 | 1.5350E−03 | −1.4978E−01 | −3.2111E−02 | −1.6366E−03 | −4.3249E−02 |
| A8 | 2.1672E−01 | 4.8857E−01 | 8.8199E−02 | 7.6861E−01 | 2.8456E−01 | 1.2351E−01 | 2.7455E−01 |
| A10 | −8.2779E−01 | −1.4159E+00 | −3.9944E−01 | −2.2149E+00 | −1.1058E+00 | −5.4384E−01 | −7.5380E−01 |
| A12 | 1.6905E+00 | 2.5234E+00 | 8.6097E−01 | 3.8850E+00 | 2.2841E+00 | 1.0913E+00 | 1.1182E+00 |
| A14 | −2.0128E+00 | −2.8088E+00 | −1.0393E+00 | −4.2161E+00 | −2.7067E+00 | −1.2064E+00 | −9.7123E−01 |
| A16 | 1.3970E+00 | 1.8892E+00 | 7.1596E−01 | 2.7629E+00 | 1.8509E+00 | 7.5867E−01 | 4.9032E−01 |
| A18 | −5.2491E−01 | −7.0115E−01 | −2.6361E−01 | −1.0024E+00 | −6.7988E−01 | −2.5480E−01 | −1.3207E−01 |
| A20 | 8.2536E−02 | 1.0994E−01 | 4.0605E−02 | 1.5487E−01 | 1.0392E−01 | 3.5545E−02 | 1.4556E−02 |

| Surface number | S8 | S9 | S10 | S11 | S12 | S13 | S14 |
|---|---|---|---|---|---|---|---|
| K | 2.7521E+00 | 3.3702E+01 | −3.4070E+00 | −1.2251E+01 | 1.4528E+01 | −1.0190E+01 | −4.2237E+00 |
| A4 | −9.4832E−02 | −8.3360E−02 | −8.0711E−02 | 1.2131E−01 | 1.5031E−01 | −6.0268E−02 | −5.8135E−02 |
| A6 | 1.4911E−01 | 7.7100E−02 | 1.5398E−01 | −2.9677E−02 | −1.1024E−01 | 1.9480E−03 | 1.5300E−02 |
| A8 | −2.3008E−01 | 6.5333E−02 | −1.8541E−01 | −5.9290E−02 | 3.9271E−02 | 5.2434E−03 | −1.8964E−03 |
| A10 | 2.3891E−01 | −2.3590E−01 | 1.3389E−01 | 5.6557E−02 | −8.6773E−03 | −2.0053E−03 | −5.6938E−04 |
| A12 | −1.6710E−01 | 2.7787E−01 | −6.2968E−02 | −2.6798E−02 | 1.2060E−03 | 3.5232E−04 | 2.7551E−04 |
| A14 | 7.7894E−02 | −1.8359E−01 | 1.9817E−02 | 7.9746E−03 | −1.0583E−04 | −2.9696E−05 | −4.7604E−05 |
| A16 | −2.3424E−02 | 7.1963E−02 | −3.9499E−03 | −1.5050E−03 | 6.0787E−06 | 7.5925E−07 | 4.1965E−06 |
| A18 | 4.0821E−03 | −1.5742E−02 | 4.3524E−04 | 1.6421E−04 | −2.4376E−07 | 4.1193E−08 | −1.8823E−07 |
| A20 | −2.9368E−04 | 1.4860E−03 | −1.9239E−05 | −7.8415E−06 | 5.7863E−09 | −2.1488E−09 | 3.4081E−09 |

Figure 17:
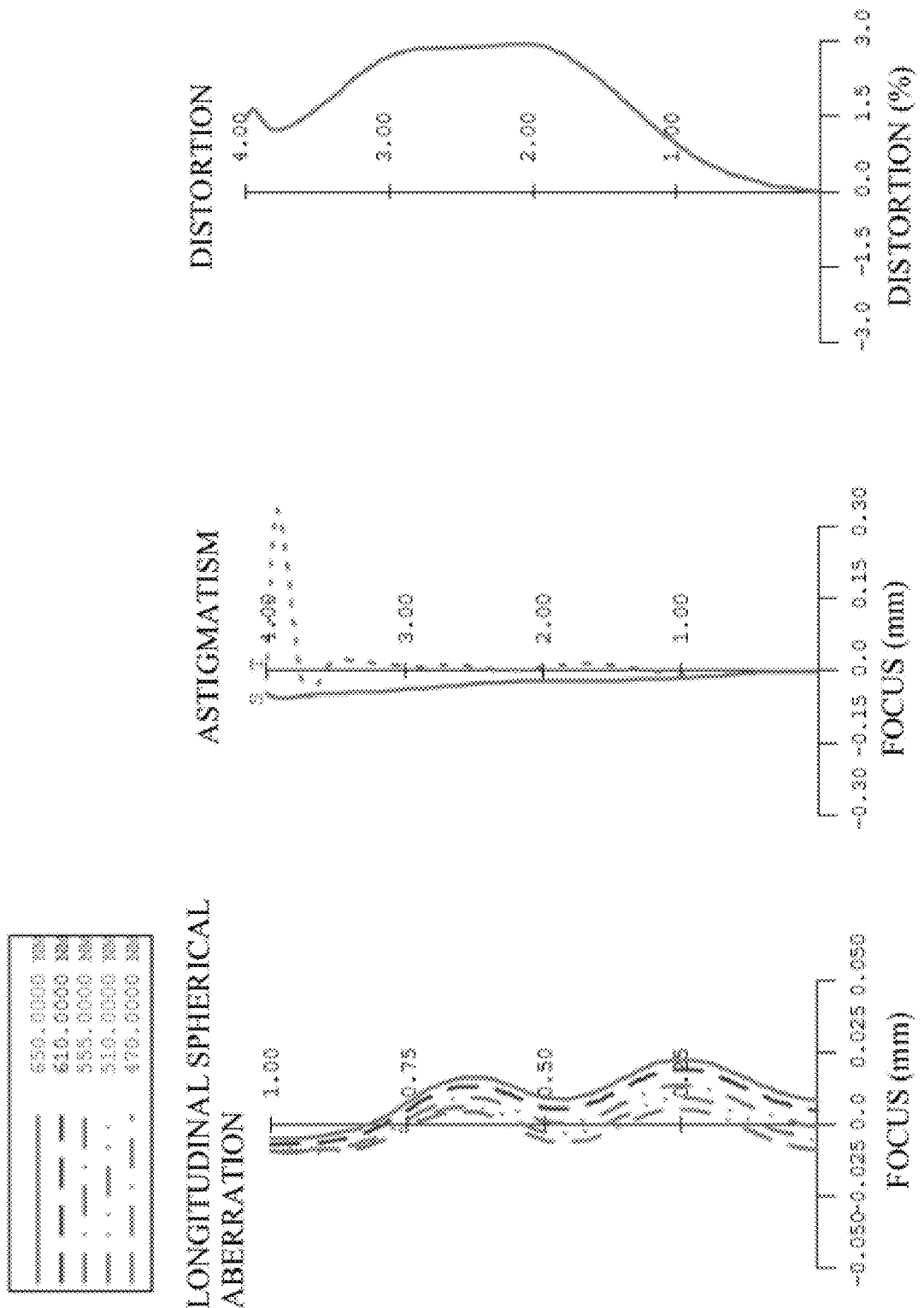
FIG. 17 illustrates a longitudinal spherical aberration curve, an astigmatic curve, and a distortion curve of the optical system of FIG. 16.

FIG. 17 shows a longitudinal spherical aberration curve, an astigmatic curve, and a distortion curve of the optical system according to the implementation of FIG. 16. The longitudinal spherical aberration curve represents deviation in focal point of rays with different wavelengths after the rays go through the lenses of the optical system. The astigmatic curve represents tangential image plane bending and sagittal image plane bending. The distortion curve represents distortion values corresponding to different angles of view. As can be seen in FIG. 17, the optical system in the implementation of FIG. 16 has high imaging quality.

Table 9 shows the values of tan ω/f, f/f5, f1/f, TTL/EPD, f12/f34, n4, FNO/ImgH, f/CT5, and Y2/Y1+Y3/Y1+Y4/Y1 of the optical system of the above implementations.

TABLE 9

|  | tanω/f | f/f5 | f1/f | TTL/EPD | f12/f34 |
|---|---|---|---|---|---|
| Implementation of FIG. 2 | 0.281 | 1.341 | 1.314 | 2.774 | −0.511 |
| Implementation of FIG. 4 | 0.303 | 1.247 | 1.335 | 2.636 | −0.465 |
| Implementation of FIG. 6 | 0.312 | 1.069 | 1.295 | 2.537 | −0.133 |
| Implementation of FIG. 8 | 0.261 | 1.219 | 1.185 | 2.406 | −0.215 |
| Implementation of FIG. 10 | 0.234 | 0.504 | 1.190 | 2.420 | −0.351 |
| Implementation of FIG. 12 | 0.357 | 1.053 | 1.576 | 1.372 | −0.538 |
| Implementation of FIG. 14 | 0.270 | 1.012 | 1.426 | 2.634 | −0.517 |
| Implementation of FIG. 16 | 0.216 | 1.316 | 1.598 | 2.547 | −0.484 |

TABLE 9-continued

|  | n4 | FNO/ImgH | f/CT5 | Y2/Y1 + Y3/Y1 + Y4/Y1 |
|---|---|---|---|---|
| Implementation of FIG. 2 | 1.671 | 0.550 | 4.753 | 3.022 |
| Implementation of FIG. 4 | 1.670 | 0.514 | 4.667 | 3.035 |
| Implementation of FIG. 6 | 1.671 | 0.450 | 5.021 | 3.058 |
| Implementation of FIG. 8 | 1.671 | 0.438 | 4.372 | 3.027 |
| Implementation of FIG. 10 | 1.671 | 0.438 | 4.773 | 2.950 |
| Implementation of FIG. 12 | 1.671 | 0.450 | 3.701 | 3.571 |
| Implementation of FIG. 14 | 1.671 | 0.438 | 4.304 | 3.087 |
| Implementation of FIG. 16 | 1.671 | 0.463 | 4.250 | 3.087 |

As can be seen in Table 9, each of these implementations satisfies the expressions tan ω/f>0.21 mm−1, 0.5<f/f5<1.4, 1<f1/f<1.6, TTL/EPD<2.8, f12/f34>−0.54, 1.66<n4<1.69, FNO/ImgH≤0.55 mm−1, 3.7<f/CT5<5.1, Y2/Y1+Y3/Y1+Y4/Y1<3.1.

The implementations are described as above. It should be noted that any modifications, or improvements that can be made by those skilled in the art without departing from the spirits and principles of this disclosure shall all be encompassed within the protection of this disclosure.

What is claimed is:

1. An optical system comprising in order from an object side to an image side:
   a first lens with a positive refractive power, wherein the first lens has an object-side surface which is convex at an optical axis;
   a second lens with a refractive power, wherein the second lens has an object-side surface which is convex at the optical axis;
   a third lens with a refractive power, wherein the third lens has an image-side surface which is convex at the optical axis;
   a fourth lens with a refractive power;
   a fifth lens with a positive refractive power, wherein the fifth lens has an image-side surface which is convex at the optical axis;
   a sixth lens with a refractive power; and
   a seventh lens with a refractive power, wherein the seventh lens has an object-side surface which is convex at the optical axis and an image-side surface which is concave at the optical axis, and at least one of the object-side surface or the image-side surface of the seventh lens has an inflection point;
   wherein the optical system satisfies the following expressions:

$\tan \omega / f > 0.21 \text{mm}^{-1}$, and $Y2/Y1 + Y3/Y1 + Y4/Y1 < 3.1$, wherein tan ω represents a tangential value of half of a maximum angle of view of the optical system, f represents an effective focal length of the optical system, Y1 represents an optical maximum effective radius of the object-side surface of the first lens, Y2 represents an optical maximum effective radius of the object-side surface of the second lens, Y3 represents an optical maximum effective radius of an object-side surface of the third lens, and Y4 represents an optical maximum effective radius of an object-side surface of the fourth lens; and
   wherein the optical system satisfies the following expression:

$TTL/EPD < 2.8$, wherein TTL represents a distance on the optical axis from the object-side surface of the first lens to an imaging surface of the optical system, and EPD represents an entrance pupil diameter of the optical system, wherein the optical system satisfies the following expression:

$3.7 < f/CT5 < 5.1$, wherein CT5 represents a thickness of the fifth lens on the optical axis.

2. The optical system as claimed in claim 1, wherein the optical system satisfies the following expression:

$1 < f1/f < 1.6$, wherein f1 represents a focal length of the first lens.

3. The optical system as claimed in claim 1, wherein the optical system satisfies the following expression:

$f12/f34 > -0.54$, wherein f12 represents a combined focal length of the first lens and the second lens, and f34 represents a combined focal length of the third lens and the fourth lens.

4. The optical system as claimed in claim 1, wherein the optical system satisfies the following expression:

$1.66 < n4 < 1.69$, wherein n4 represents a refractive index of the fourth lens.

5. The optical system as claimed in claim 1, wherein the optical system satisfies the following expression:

$0.5 < f/f5 < 1.4$, wherein f5 represents a focal length of the fifth lens.

6. The optical system as claimed in claim 1, wherein the optical system satisfies the following expression:

$FNO/ImgH \leq 0.55 \text{ mm}^{-1}$, wherein FNO represents an F-number of the optical system, and ImgH represents half of a diagonal length of an effective pixel area on an imaging surface of the optical system.

7. A lens module, comprising:
   an optical system comprising in order from an object side to an image side:
   a first lens with a positive refractive power, wherein the first lens has an object-side surface which is convex at an optical axis;
   a second lens with a refractive power, wherein the second lens has an object-side surface which is convex at the optical axis;
   a third lens with a refractive power, wherein the third lens has an image-side surface which is convex at the optical axis;
   a fourth lens with a refractive power;
   a fifth lens with a positive refractive power, wherein the fifth lens has an image-side surface which is convex at the optical axis;
   a sixth lens with a refractive power;
   a seventh lens with a refractive power, wherein the seventh lens has an object-side surface which is convex at the optical axis and an image-side surface which is concave at the optical axis, and at least one of the object-side surface or the image-side surface of the seventh lens has an inflection point;
   wherein the optical system satisfies the following expressions:

$\tan \omega / f > 0.21 \text{ mm}^{-1}$, and $Y2/Y1 + Y3/Y1 + Y4/Y1 < 3.1$, wherein tan ω represents a tangential value of half of a maximum angle of view of the optical system, f represents an effective focal length of the optical system, Y1 represents an optical maximum effective radius of the object-side surface of the first lens, Y2 represents an optical maximum effective radius of the object-side surface of the second lens, Y3 represents an optical maximum effective radius of an object-side surface of the third lens, and Y4 represents an optical maximum effective radius of an object-side surface of the fourth lens; and
   a photosensitive element located at the image side of the optical system;
   wherein the optical system satisfies the following expression:

$TTL/EPD < 2.8$, wherein TTL represents a distance on the optical axis from the object-side surface of the first lens to an imaging surface of the optical system, and EPD represents an entrance pupil diameter of the optical system, wherein the optical system satisfies the following expression:

$$3.7<f/CT5<5.1,$$

wherein CT5 represents a thickness of the fifth lens on the optical axis.

8. The lens module as claimed in claim 7, wherein the optical system satisfies the following expression:

$$1<f1/f<1.6,$$

wherein f1 represents a focal length of the first lens.

9. The lens module as claimed in claim 7, wherein the optical system satisfies the following expression:

$$f12/f34>-0.54,$$

wherein f12 represents a focal length of the first lens and the second lens, and f34 represents a combined focal length of the third lens and the fourth lens.

10. The lens module as claimed in claim 7, wherein the optical system satisfies the following expression:

$$1.66<n4<1.69,$$

wherein n4 represents a refractive index of the fourth lens.

11. The lens module as claimed in claim 7, wherein the optical system satisfies the following expression:

$$0.5<f/f5<1.4,$$

wherein f5 represents a focal length of the fifth lens.

12. A terminal device, comprising a lens module, the lens module comprising:
an optical system comprising in order from an object side to an image side:
a first lens with a positive refractive power, wherein the first lens has an object-side surface which is convex at an optical axis;
a second lens with a refractive power, wherein the second lens has an object-side surface which is convex at the optical axis;
a third lens with a refractive power, wherein the third lens has an image-side surface which is convex at the optical axis;
a fourth lens with a refractive power;
a fifth lens with a positive refractive power, wherein the fifth lens has an image-side surface which is convex at the optical axis;
a sixth lens with a refractive power;
a seventh lens with a refractive power, wherein the seventh lens has an object-side surface which is convex at the optical axis and an image-side surface which is concave at the optical axis, and at least one of the object-side surface or the image-side surface of the seventh lens has an inflection point;

wherein the optical system satisfies the following expressions:

$$\tan \omega/f>0.21 \text{ mm}^{-1}, \text{ and}$$

$$Y2/Y1+Y3/Y1+Y4/Y1<3.1,$$

wherein tan ω represents a tangential value of half of a maximum angle of view of the optical system, f represents an effective focal length of the optical system, Y1 represents an optical maximum effective radius of the object-side surface of the first lens, Y2 represents an optical maximum effective radius of the object-side surface of the second lens, Y3 represents an optical maximum effective radius of an object-side surface of the third lens, and Y4 represents an optical maximum effective radius of an object-side surface of the fourth lens; and a photosensitive element located at the image side of the optical system;

wherein the optical system satisfies the following expression:

$$TTL/EPD<2.8,$$

wherein TTL represents a distance on the optical axis from the object-side surface of the first lens to an imaging surface of the optical system, and EPD represents an entrance pupil diameter of the optical system, wherein the optical system satisfies the following expression:

$$3.7<f/CT5<5.1,$$

wherein CT5 represents a thickness of the fifth lens on the optical axis.

13. The lens module as claimed in claim 12, wherein the optical system satisfies the following expression:

$$1<f1/f<1.6,$$

wherein f1 represents a focal length of the first lens.

14. The lens module as claimed in claim 12, wherein the optical system satisfies the following expression:

$$f12/f34>-0.54,$$

wherein f12 represents a combined focal length of the first lens and the second lens, and f34 represents a combined focal length of the third lens and the fourth lens.

15. The terminal device as claimed in claim 12, wherein the optical system satisfies the following expression:

$$1.66<n4<1.69,$$

wherein n4 represents a refractive index of the fourth lens.

16. The terminal device as claimed in claim 12, wherein the optical system satisfies the following expression:

$$0.5<f/f5<1.4,$$

wherein f5 represents a focal length of the fifth lens.

* * * * *